United States Patent
Jacobson et al.

(10) Patent No.: US 11,537,651 B2
(45) Date of Patent: *Dec. 27, 2022

(54) DESCRIPTIVE MEDIA CONTENT SEARCH

(71) Applicant: Spotify AB, Stockholm (SE)

(72) Inventors: Kurt Jacobson, Stoneham, MA (US); Paul Lamere, Boston, MA (US)

(73) Assignee: Spotify AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/489,937

(22) Filed: Sep. 30, 2021

(65) Prior Publication Data

US 2022/0092103 A1  Mar. 24, 2022

Related U.S. Application Data

(63) Continuation of application No. 15/988,943, filed on May 24, 2018, now Pat. No. 11,163,817.

(51) Int. Cl.
  *G06F 16/00* (2019.01)
  *G06F 16/48* (2019.01)
  *G06F 16/41* (2019.01)
  *G06F 16/438* (2019.01)
  *G06F 16/2457* (2019.01)

(52) U.S. Cl.
  CPC ........ *G06F 16/48* (2019.01); *G06F 16/24578* (2019.01); *G06F 16/41* (2019.01); *G06F 16/4387* (2019.01)

(58) Field of Classification Search
  CPC .................. G06F 16/48; G06F 16/4387; G06F 16/24578; G06F 16/41
  See application file for complete search history.

(56) References Cited

U.S. PATENT DOCUMENTS

| | | |
|---|---|---|
| 8,713,069 B2 | 4/2014 | Chen et al. |
| 11,163,817 B2 | 11/2021 | Jacobson |
| 2004/0117189 A1* | 6/2004 | Bennett .................... G09B 5/04 704/E15.04 |
| 2005/0055372 A1 | 3/2005 | Springer, Jr. |
| 2005/0071328 A1* | 3/2005 | Lawrence ............. G06F 16/248 |
| 2006/0195480 A1 | 8/2006 | Spiegelman et al. |

(Continued)

OTHER PUBLICATIONS

K. Yeung, YouTube offers creators new tools to add videos from other channels through playlists, Sep. 12, 2013, retrieved on Oct. 27, 2020, Internet <URL: https://thenextweb.com/google/2013/09/12/youtube-offers-creators-new-tools-to-add-videos-from-other-channels-through-playlists/> (Year: 2013).*

(Continued)

*Primary Examiner* — Tyler J Torgrimson
(74) *Attorney, Agent, or Firm* — Merchant & Gould P.C.

(57) ABSTRACT

A descriptive media content search solution is provided to allow a user to search for media content that better matches a user's descriptive search request. The descriptive media content search solution utilizes an extensive catalog of playlists each having a playlist description, such as a playlist title or other descriptive text, and identifies additional descriptive information for media content items to be searched. The descriptive media content search solution can set up a descriptive search database and utilize the descriptive search database to conduct a descriptive search responsive to the user's descriptive search request.

20 Claims, 15 Drawing Sheets

(56) References Cited

U.S. PATENT DOCUMENTS

| | | | |
|---|---|---|---|
| 2009/0094231 A1* | 4/2009 | Marvit | G06F 40/117 707/999.005 |
| 2011/0295843 A1 | 12/2011 | Ingrassia, Jr. et al. | |
| 2015/0058367 A1 | 2/2015 | Brull et al. | |
| 2016/0360266 A1* | 12/2016 | Wilms | H04N 21/4756 |
| 2018/0189306 A1 | 7/2018 | Lamere et al. | |
| 2020/0278997 A1 | 9/2020 | Lamere | |

OTHER PUBLICATIONS

Apple, How to Add Songs from one playlist to another playlist, Aug. 29, 2012, retrieved on Oct. 27, 2020, Internet <URL: https://discussions.apple.com/thread/4250856#:~:text=Tap%20on%20the%20playlist%20that,Songs%20%2D%20tap%20Done%20when%20finished.> (Year: 2012).*

H. Shan, Understanding the Delicate Art of the Mixtape, Sep. 16, 2017, retrieved on Oct. 27, 2020, Internet <URL: https://www.wpr.org/understanding-delicate-art-mixtape> (Year: 2017).*

Spotify, [Playlists] Add Song to multiple Playlists at once, Oct. 14, 2015, retrieved on Oct. 27, 2020, Internet <URL: https://community.spotify.com/t5/Closed-Ideas/Playlists-Add-Song-to-multiple-Playlists-at-once/idc-p/1223089/highlight/true> (Year: 2015).*

Apple, How to Add Songs from one playlist to another playlist, Aug. 29, 2012, retrieved on Oct. 27, 2020, Internet <URL: https://discussions.apple.com/thread/4250856#:.about.:text=Tap%20on%20the-%20playlist%20that,Songs%20%2D%20tap%20Done%20when%20finished.> (Year: 2012).

"Tf-idf," Wikipedia, dated May 16, 2018. Available at: https://en.wikipedia.org/w/index.php?title=Tf-idf&oldid=841608474.

"NLTK 3.4 documentation: Natural Language Toolkit", TLTK Project, Last updated Nov. 17, 2018, available at: https://www.nltk.org/, 2 pages.

* cited by examiner

| Track Name | Item ID | Playlist ID | Descriptive Terms | Genre |
|---|---|---|---|---|
| ABC | 12345abw | tiw89832, dcd34312 | "relax" (x2) "great" "night" (x2) "afterwork" "kid" "favorite" "good" ... | jazz |
| BCD | 12346def | tiw89832, ikd75673 | "relax" (x3) "great" "night" "afterwork" "world" "very" ... | jazz |
| CDE | 46837xjw | tiw89832 | "relax" (x2) "great" "night" "afterwork" ... | blues |
| XYZ | 56986dif | dcd34312 | "kid" "favorite" "good" "night" ... | pop |
| LMN | 69863wdf | dcd34312 | "kid" "favorite" "good" "night" ... | folk |
| ZAB | 59837xjw | ikd75673 | "world" "very" "relax" ... | jazz |
| WXY | 47589olk | ikd75673 | "world" "very" "relax" ... | country |
| ... | | | ... | ... |

FIG. 9

DESCRIPTIVE MEDIA CONTENT SEARCH

CROSS-REFERENCE TO RELATED APPLICATION(S)

This application is a Continuation of U.S. application Ser. No. 15/988,943, filed on May 24, 2018, titled DESCRIPTIVE MEDIA CONTENT SEARCH, the disclosure of which is hereby incorporated by reference in its entirety. To the extent appropriate a claim of priority is made to the above-disclosed application.

BACKGROUND

Music search algorithms are typically based on known metadata of the music that is stored in a music library metadata database. The metadata includes typical information that is commonly associated with music, such as the name of the song, the name of the artist, a genre, a release date, and the like. This type of music search may be helpful for a user to identify a particular track if the user knows that information about the track. However, the music search of this type does not provide relevant search results if the user query describes something that is not included in the music metadata database.

SUMMARY

In general terms, the present disclosure is directed to descriptive media content search. In one possible configuration and by non-limiting example, the descriptive media content search utilizes playlist descriptions to provide additional information to describe media content. Various aspects are described in this disclosure, which include, but are not limited to, the following aspects.

One aspect is a method of selecting and providing media content responsive to a query. The method includes identifying descriptive terms associated with media content items, and selecting and providing one or more media content items responsive to a query. The descriptive terms associated with media content items may be identified by identifying a plurality of playlists, each of the plurality of playlists associated with one or more media content items and having a playlist description; and for each of the plurality of playlists, tokenizing the playlist description into one or more tokenized terms; and associating each of the media content items in the respective playlist with the tokenized terms. The media content items responsive to a query may be selected and provided by receiving the query including at least one descriptor, identifying the descriptor from the query, and identifying one or more media content items, from the plurality of playlists, associated with the descriptor based on the tokenized terms.

In certain examples, the user query is a voice request from a user. In certain examples, the method may include converting the voice request into text data, determining an intent and at least one slot from the text data, and identifying the descriptor from at least one of the intent and the at least one slot.

In certain examples, the descriptive terms associated with media content items may be identified by, for each media content item in the plurality of playlists, weighting the media content items associated with the tokenized terms. The identification of the media content items may be based on the tokenized terms and the weightings of the tokenized terms.

In certain examples, the method may include calculating a first term frequency, the first term frequency associated with a frequency of each of the tokenized terms appearing in each of the media content items; calculating a second term frequency, the second term frequency associated with a frequency of each of the tokenized terms appearing in all of the media content items; and calculating a relevance score based on the first term frequency and the second term frequency, the relevance score representative of relevancy of each of the tokenized terms to each of the media content items.

In certain examples, the media content items are identified from the plurality of playlists based at least in part on the relevance score.

In certain examples, weighting is performed using term frequency and inverse document frequency (TFIDF).

In certain examples, the method may include, after weighting the media content items associated with the tokenized terms, generating an inverted index that stores the associations between the media content items with the tokenized terms.

In certain examples, the playlist description includes a playlist title and a descriptive text. In certain examples, the descriptive text is obtained from at least one of user reviews, expert reviews, and statistics.

In certain examples, the method may include retrieving a user profile associated with a user who provided the user query, and determining personalized media content items from the resulting media content items based on the user profile.

In certain examples, the method may include retrieving a descriptive term lexicon. The playlist description may be tokenized into one or more tokenized terms based on the descriptive term lexicon.

In certain examples, the method may include retrieving metadata of media content items of the playlists. The media content items may be identified from the plurality of playlists based in part on the metadata.

Another aspect is a media delivery system for selecting and providing media content responsive to a user query. The media delivery system includes at least one processing device and at least one data storage device storing data instructions executable by the at least one processing device to cause the media delivery system to identify descriptive terms associated with media content items, and select and provide one or more media content items responsive to a user query. The descriptive terms associated with media content items may be identified by identifying a plurality of playlists, each of the plurality of playlists associated with one or more media content items and having a playlist description; and, for each of the plurality of playlists, tokenizing the playlist description into one or more tokenized terms; and associating each of the media content items in the respective playlist with the tokenized terms. The media content items responsive to a user query may be selected and provided by receiving the user query including at least one descriptor, identifying the descriptor from the user query, and identifying one or more media content items, from the plurality of playlists, associated with the descriptor based on the tokenized terms.

In certain examples, the data instructions may further cause the media delivery system to, for each media content item in the plurality of playlists, weight the media content items associated with the tokenized terms. the media content items may be identified based on the tokenized terms and the weightings of the tokenized terms.

In certain examples, the data instructions may further cause the media delivery system to calculate a first term frequency, the first term frequency associated with a frequency of each of the tokenized terms appearing in each of the media content items; calculate a second term frequency, the second term frequency associated with a frequency of each of the tokenized terms appearing in all of the media content items; and calculate a relevance score based on the first term frequency and the second term frequency, the relevance score representative of relevancy of each of the tokenized terms to each of the media content items.

In certain examples, the media content items may be identified from the plurality of playlists based at least in part on the relevance score.

In certain examples, the data instructions may further cause the media delivery system to weight the media content items associated with the tokenized terms using term frequency and inverse document frequency (TFIDF).

In certain examples, the data instructions may further cause the media delivery system to, after weighting the media content items associated with the tokenized terms, generate an inverted index that stores the associations between the media content items with the tokenized terms.

In certain examples, the playlist description may include a playlist title and a descriptive text.

BRIEF DESCRIPTION OF THE DRAWINGS

FIG. 9 illustrates an example data structure that associates the descriptive terms with media content items.

DETAILED DESCRIPTION

Figure 1:
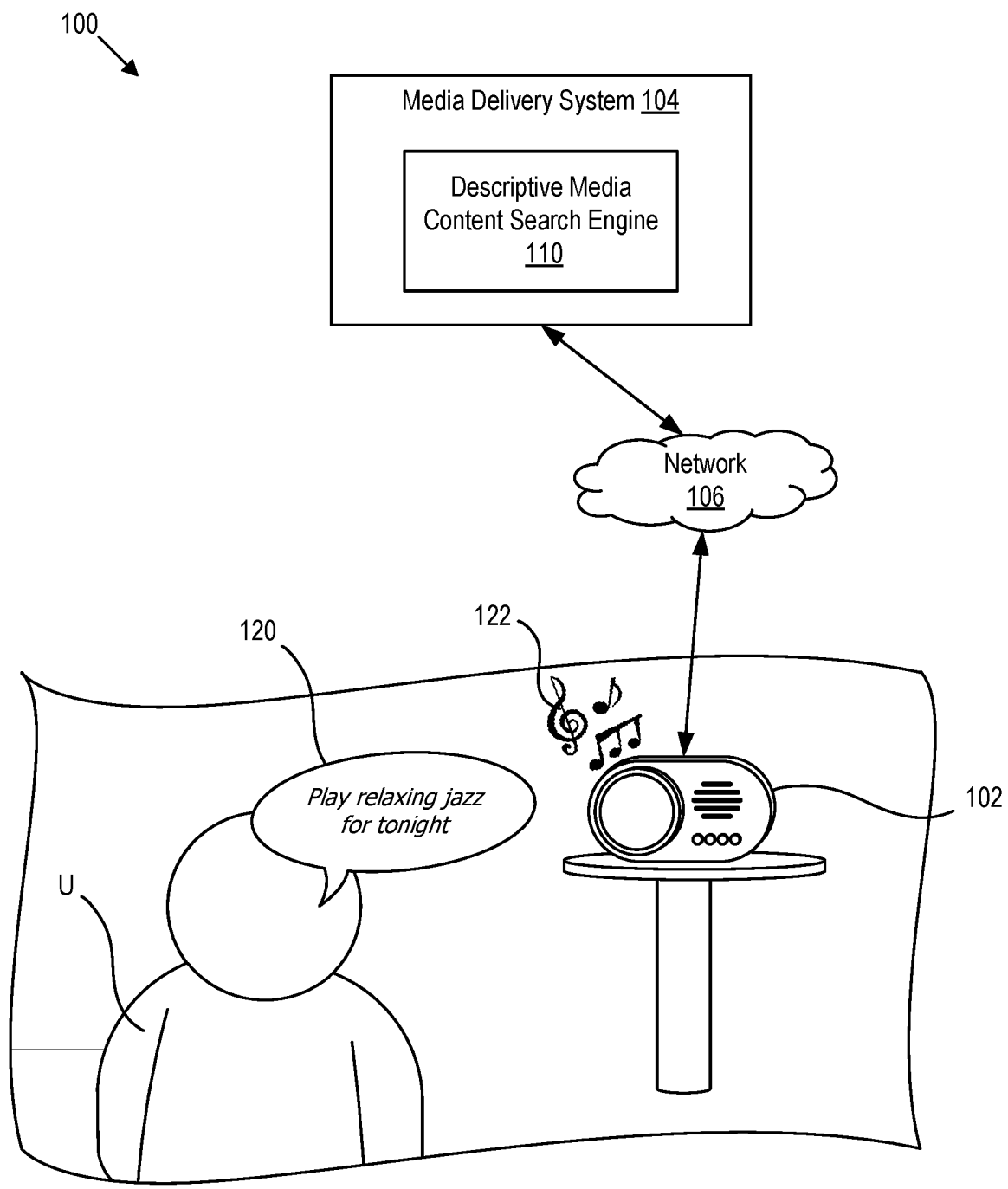
FIG. 1 illustrates an example system for providing media content to a user.

Various embodiments will be described in detail with reference to the drawings, wherein like reference numerals represent like parts and assemblies throughout the several views.

In general, the present disclosure relates to a descriptive media content search solution that allows for searching for and identifying media content based on descriptive terms.

In various media content search contexts, a search request can include a series of descriptors. Such a search request with descriptors may not return satisfactory search results if used with typical entity-focused search indexes, such as search algorithms based on known metadata of the media content that is stored in a music library metadata database. For example, when the search request includes descriptors that are not found in the metadata, the search results do not fully reflect the descriptors in the search request. By way of example, when a search query is "play some relaxing jazz music," a descriptive term to be searched can include "relaxing" (or its variant) or "relaxing jazz" (or its variant), and this descriptive term is not typically found in the metadata of media content.

The present disclosure provides a solution to allow a user to search for media content that better matches the user's descriptive search request. Further, the solution according to the present disclosure can provide relevant search results even when the user do not know specific information about the media content the user wants to listen to, but can describe general characteristic of the media content with descriptive terms. Examples of descriptive terms relate to moods (relaxing, happy, sad, somber, etc.), types of activities (such as running, working out, driving, dancing, etc.), or any other descriptors that are not typically found in the metadata of media content but describe some aspect of the media content.

An exemplary embodiment of the present disclosure utilizes an extensive catalog of playlists each having a playlist description, such as a playlist title or other descriptive text, and identifies additional descriptive information for media content items to be searched. The embodiment of the present disclosure can involve setting up a descriptive search database, and then utilizing the descriptive search database to conduct a descriptive search responsive to a descriptive search query. The embodiment of the present disclosure can analyze a variety of data associated with the catalog of playlists, such as the playlist descriptions, to generate descriptive terms (e.g., tokens) for media content to be searched for. The descriptive search database can be generated with the descriptive terms that map to media content items in the catalog of playlists.

FIG. 1 illustrates an example system 100 for providing media content to a user U. The system 100 includes a media playback device 102, a media delivery system 104, and a data communication network 106. The media delivery system 104 includes a descriptive media content search engine 110. An example user query 120 and a media output 122 are also shown.

The media playback device 102 operates to provide media content to a user U. As described herein, the media playback device 102 operates to receive the user query 120 and provide the media output 122 to the user U according to the user query 120. In some embodiments, the media playback device 102 operates to communicate with a system external to the media playback device 102, such as the media delivery system 104. The media playback device 102 can interact with the media delivery system 104 to process the user query 120 and identify media content in response to the user query 120. In some embodiments, the media playback device 102 operates to receive the media content that is identified and provided (e.g., streamed, transmitted, etc.) by the media delivery system 104. In some embodiments, the media playback device 102 operates to play the media content and generate the media output 122 using a media output device (e.g., a speaker) therein. In other embodiments, the media playback device 102 operates to transmit the media content to another device for playback, such as an external speaker or another media playback device (e.g., a vehicle entertainment system or a home entertainment system). An example of the media playback device 102 is illustrated and described in more detail herein, such as with reference to FIG. 2.

The media delivery system 104 operates to provide media content to one or more media playback devices, such as the media playback device 102, via the network 106. An example of the media delivery system 104 is illustrated and described in further detail herein, such as with reference to FIG. 2.

The network 106 is a data communication network that facilitates data communication between the media playback device 102 and the media delivery system 104. The network 106 typically includes a set of computing devices and communication links between the computing devices. The computing devices in the network 106 use the links to enable communication among the computing devices in the network. The network 106 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of communication links. For example, the network 106 can include wired and/or wireless links, including cellular, Bluetooth®, Wi-Fi®, ultra-wideband (UWB), 802.11, ZigBee, near field communication (NFC), an ultrasonic data transmission, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (WAN) (such as the Internet), or can be implemented at another scale. Further, in some embodiments, the network 106 includes multiple networks, which may be of the same type or of multiple different types.

Referring still to FIG. 1, in some embodiments, the media delivery system 104 includes the descriptive media content search engine 110 that operates to determine media content in response to the user query 120.

As described herein, the user query 120 includes a search request from the user U to identify media content. The user query 120 can be also referred to herein as a search query, a search request, or the like. In some embodiments, the user query 120 can be a text that is typed using the media playback device 102 or another computing device. In other embodiments, the user query 120 can be a voice request received through a sound detection device (e.g., a microphone). As described herein, the voice request can be processed into a text query suitable for media content search.

In some embodiments, the user query 120 includes one or more descriptive terms (also referred to herein as descriptors) that can be used as one or more keywords to identify media content associated with the keywords. In the illustrated example of FIG. 1, the user query 120 can be a voice request that is converted into a text query of "play relaxing jazz for tonight." In this example, the descriptive terms in the user query 120 can include "relaxing" or its variant (e.g., "relax" or "relaxation"), "tonight" or its variant (e.g., "night"), and/or "jazz" or its variant (e.g., "jazzy"). Alternatively, in this example, the descriptive terms in the user query 120 can include "relaxing jazz" as a single phrase instead of "relaxing" and "jazz" as two separate words. Other examples are also possible.

The descriptive media content search engine 110 operates to select media content based on one or more descriptive terms in the user query 120. For example, the descriptive media content search engine 110 can identify media content associated with at least one of the descriptive terms of the user query 120, such as "relaxing," "tonight," "relaxing jazz," or "jazz" in the illustrated example. An example of the descriptive media content search engine 110 is illustrated and described in more detail herein, such as with reference to FIG. 3.

Figure 2:
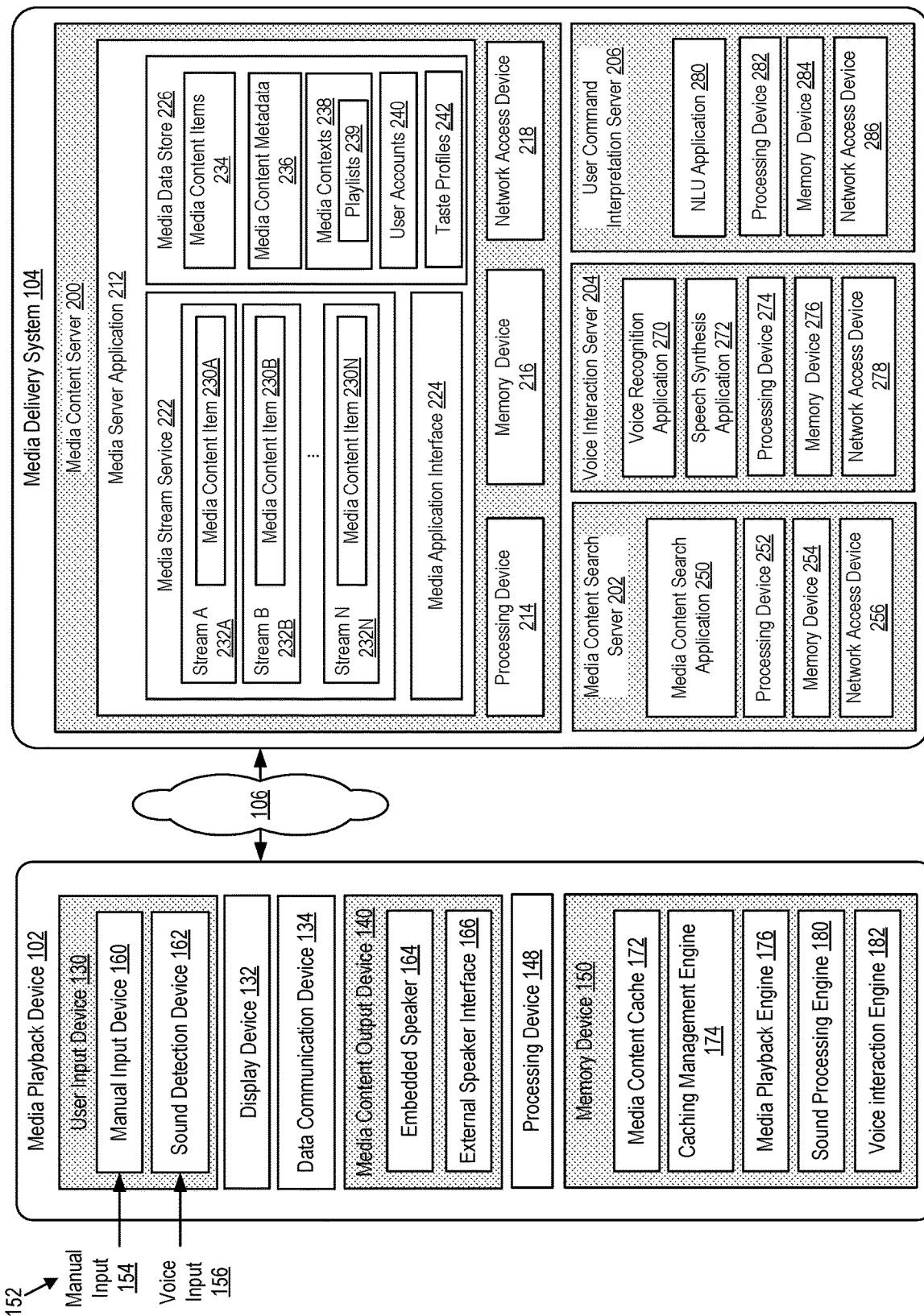
FIG. 2 is a block diagram of an example media playback device of the system shown in FIG. 1.

FIG. 2 is a block diagram of an example embodiment of the media playback device 102 of the media content provision system 100 shown in FIG. 1. In this example, the media playback device 102 includes a user input device 130, a display device 132, a wireless data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio.

In some embodiments, the media playback device 102 is a system dedicated for streaming personalized media content in a vehicle environment. An example of such a vehicular media playback device is described in U.S. patent application Ser. No. 15/973,198, titled PERSONAL MEDIA STREAMING APPLIANCE SYSTEM, filed May 7, 2018, the disclosure of which is hereby incorporated by reference in its entirety.

The user input device 130 operates to receive a user input 152 from a user U for controlling the media playback device 102. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of the user query 120. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a user's voice (also referred to herein as an utterance) for controlling playback of media content via the media playback device 102. For example, the voice input 156 includes a voice version of the user query 120 received from the sound detection device 162 of the media playback device 102. In addition, the voice input 156 is a user's voice for managing various data transmitted via the media playback device 102 and/or controlling other functions or aspects associated with the media playback device 102.

In some embodiments, the sounds detected by the sound detection device 162 can be processed by the sound processing engine 180 of the media playback device 102 as described below.

Referring still to FIG. 2, the display device 132 operates to display information to the user U. Examples of such information include media content playback information, notifications, and other information. In some embodiments, the display screen 132 is configured as a touch sensitive display and includes the manual input device 160 of the user input device 130 for receiving the manual input 154 from a selector (e.g., a finger, stylus etc.) controlled by the user U. In some embodiments, therefore, the display screen 132 operates as both a display device and a user input device. The touch sensitive display screen 132 operates to detect inputs based on one or both of touches and near-touches. In some embodiments, the display screen 132 displays a graphical user interface for interacting with the media playback device 102. Other embodiments of the display screen 132 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 106 For example, the data communication device 134 is configured to communicate with the media delivery system 104 and receive media content from the media delivery system 104 at least partially via the network 106. The data communication device 134 can be a network interface of various types which connects the media playback device 102 to the network 106. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 generates the media output 122 for the user U. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that the media output 122 is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media playback engine 176, a sound processing engine 180, and a voice interaction engine 182.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content to the user U. As described herein, the media playback engine 176 is configured to communicate with the media delivery system 104 to receive one or more media content items (e.g., through the media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 (e.g., a voice request of the user query 120) from noises included in the detected sounds. Various noise cancellation technologies, such as active noise control or cancelling technologies or passive noise control or cancelling technologies, can be used to filter the voice input from ambient noise. In examples, the sound processing engine 180 filters out omni-directional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspects of the media playback device 102. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the media playback device 102 such as volume, dominant frequency or frequencies, etc. These sound properties may be used to make inferences about the environment proximate to the media playback device 102.

The voice interaction engine 182 operates to cooperate with the media delivery system 104 (e.g., a voice interaction server 204 thereof) to identify a command (e.g., a user intent) that is conveyed by the voice input 156. In some embodiments, the voice interaction engine 182 transmits the user's voice input 156 that is detected by the sound processing engine 180 to the media delivery system 104 so that the media delivery system 104 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 104 (e.g., the voice interaction server 204 thereof) to provide a voice assistant that performs various voice-based interactions with the user, such as voice feedbacks, voice notifications, voice recommendations, and other voice-related interactions and services.

Referring still to FIG. 2, the media delivery system 104 includes a media content server 200, a media content search server 202, a voice interaction server 204, and a user command interpretation server 206.

The media delivery system 104 comprises one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200, the media content search server 202, the voice interaction server 204, and the user command interpretation server 206 are provided by separate computing devices. In other embodiments, the media content server 200, the media content search server 202, the voice interaction server 204, and the user command interpretation server 206 are provided by the same computing device(s). Further, in some embodiments, at least one of the media content server 200, the media content search server 202, the voice interaction server 204, and the user command interpretation server 206 is provided by multiple computing devices. For example, the media content server 200, the media content search server 202, the voice interaction server 204, and the user command interpretation server 206 may be provided by multiple redundant servers located in multiple geographic locations.

Although FIG. 2 shows a single media content server 200, a single media content search server 202, a single voice interaction server 204, and a single user command interpretation server 206, some embodiments include multiple media content servers, media content search servers, voice interaction servers, and user command interpretation servers. In these embodiments, each of the multiple media content servers, media content search servers, voice interaction servers, and user command interpretation servers may be identical or similar to the media content server 200, the media content search server 202, the voice interaction server 204, and the user command interpretation server 206, respectively, as described herein, and may provide similar functionality with, for example, greater capacity and redundancy and/or services from multiple geographic locations. Alternatively, in these embodiments, some of the multiple media content servers, the media content search servers, the voice interaction servers, and/or the user command interpretation servers may perform specialized functions to provide specialized services. Various combinations thereof are possible as well.

The media content server 200 transmits stream media to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 106. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items from the media content server 200. For example, in FIG. 2, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc.

The media content metadata 236 operates to provide various pieces of information associated with the media content items 234 and/or the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML, files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 2, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

Figure 8:
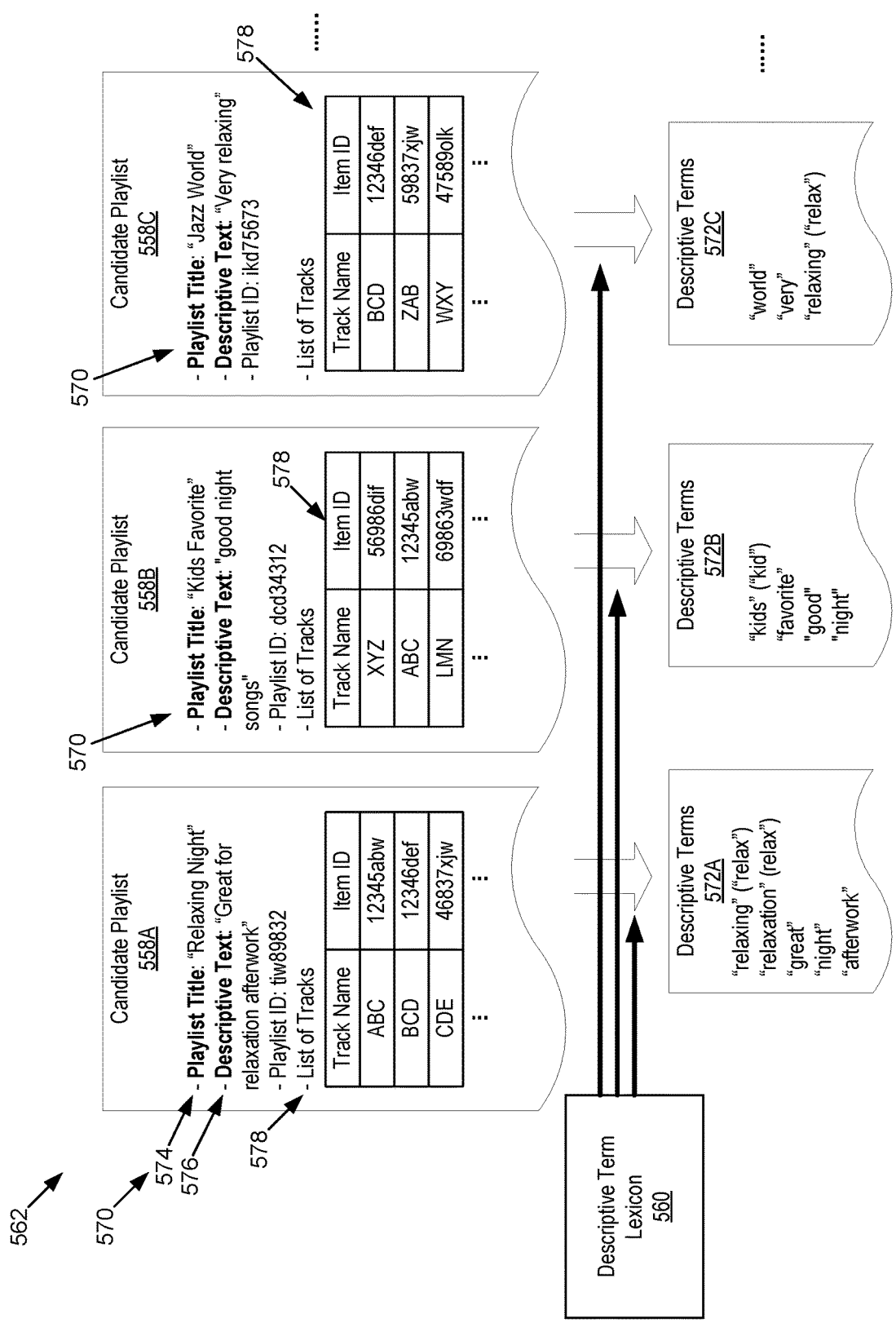
FIG. 8 illustrates an example method for identifying one or more descriptive terms from the candidate playlists.

In some embodiments, the playlist 239 includes one or more playlist descriptions, such as a playlist description 570 as illustrated in FIG. 8. The playlist descriptions include information associated with the playlist 239. The playlist descriptions can include a playlist title, such as a playlist title 574 as illustrated in FIG. 8. The playlist title is a title of the playlist. In some embodiments, the playlist title can be provided by a user using the media playback device 102. In other embodiments, the playlist title can be provided by a media content provider (or a media-streaming service provider). In yet other embodiments, the playlist title can be automatically generated.

Other examples of playlist descriptions include a descriptive text, such as a descriptive text 576 as illustrated in FIG. 8. The descriptive text can be provided by the user and/or the media content provider, which is to represent the corresponding playlist 239. In other embodiments, the descriptive text of the playlist description can be obtained from one or more other sources. Such other sources can include expert opinion (e.g., music reviews or classification of music into genres), user opinion (e.g., reviews through websites, chatrooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chat rooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist 239 includes a list of media content item identifications (IDs), such as media content item identifications (IDs) 578 as illustrated in FIG. 8. The list of media content item identifications includes one or more media content item identifications that refer to respective media content items 234. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 239 are created by a media streaming service provider. For example, such provider-created playlists can be automatically created by the media delivery system 104. In some embodiments, a provider-created playlist can be customized to a particular user or a particular group of users. By way of example, a playlist for a particular user can be automatically created by the media delivery system 104 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 2, the media content search server 202 operates to perform media content search in response to a media content search request, such as the user query 120 (FIG. 1). In some embodiments, the media content search server 202 includes a media content search application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the media content search application 250 operates to interact with the media playback device 102 and provide selection of one or more media content items based on the user query 120. As described herein, the media content search application 250 can include the descriptive media content search engine 110 (FIG. 1). The media content search application 250 can interact with other servers, such as the media content server 200, the voice interaction server 204, and the user command interpretation server 206, to perform media content search.

Referring still to FIG. 2, the voice interaction server 204 operates to provide various voice-related functionalities to the media playback device 102. In some embodiments, the voice interaction server 204 includes a voice recognition application 270, a speech synthesis application 272, a processing device 274, a memory device 276, and a network access device 278. The processing device 274, the memory device 276, and the network access device 278 may be similar to the processing device 214, the memory device 216, and the network access device 218, respectively, which have each been previously described.

In some embodiments, the voice recognition application 270 and the speech synthesis application 272, either individually or in combination, operate to interact with the media playback device 102 and enable the media playback device 102 to perform various voice-related functions, such as voice media content search, voice feedback, voice notifications, etc.

In some embodiments, the voice recognition application 270 is configured to perform speech-to-text (STT) conversion, such as receiving a recording of voice command (e.g., an utterance) and converting the utterance to a text format.

In some embodiments, the speech synthesis application 272 is configured to perform text-to-speech (TTS) conversion, so that a language text is converted into speech. Then, the voice interaction server 204 can transmit an audio data or file for the speech to the media playback device 102 so that the media playback device 102 generates a voice assistance to the user using the transmitted audio data or file.

Referring still to FIG. 2, the user command interpretation server 206 operates to analyze a text version of a user command (e.g., a text version of the utterance) to determine appropriate actions to take according to the user command.

In some embodiments, the user command interpretation server 206 includes a natural language understanding (NLU) application 280, a processing device 282, a memory device 284, and a network access device 286. The processing device 282, the memory device 284, and the network access device 286 may be similar to the processing device 214, the memory device 216, and the network access device 218, respectively, which have each been previously described.

In some embodiments, the NLU application 280 operates to analyze the text format of the utterance to determine functions to perform based on the utterance. The NLU application 280 can use a natural language understanding algorithm that involves modeling human reading comprehension, such as parsing and translating an input according to natural language principles.

Figure 3:
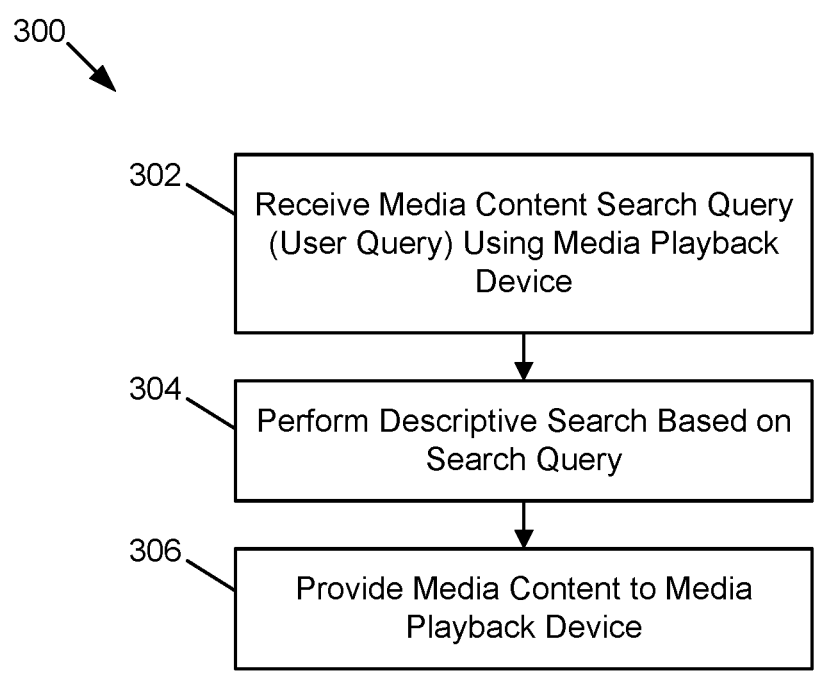
FIG. 3 is a flowchart of an example method for selecting and providing media content responsive to a user query.

FIG. 3 is a flowchart of an example method 300 for selecting and providing media content responsive to a user query 120. It is described herein that the method 300 is at least partially performed primarily by the media delivery system 104 (e.g., the descriptive media content search engine 110 thereof) that interacts with the media playback device 102. In other embodiments, the method 300 can be at least partially performed by the media playback device 102 that interacts with the media delivery system 104. In yet other embodiments, the method 300 can be at least partially performed by the media playback device 102 and the media delivery system 104.

At operation 302, the media delivery system 104 operates to receive a media content search query, such as the user query 120 (FIG. 1). In some embodiments, the user query 120 can be received using the media playback device 102.

As described herein, in some embodiments, the user query 120 is a text typed by the user using the media playback device 102. In the illustrated example of FIG. 1, the user can type in the text (a text form of "play relaxing jazz for tonight") via the manual input device 160 of the media playback device 102. In some embodiments, the text of the user query 120 can be analyzed to identify descriptive terms (e.g., descriptors) that are to be used for media content search as described herein.

In other embodiments, the user query 120 is an utterance that is received and recorded using the media playback device 102. In the illustrated example of FIG. 1, the user can speak the voice request (an audio form of "play relaxing jazz for tonight") via the sound detection device 162 of the media playback device 102. The utterance of the user query 120 received via the media playback device 102 can be processed into a text version and further analyzed to identify descriptive terms (e.g., descriptors) that can be used for media content search as described herein. An example method for processing the utterance of the user query 120 is illustrated and described in more detail herein, for example with reference to FIG. 4.

At operation 304, the media delivery system 104 operates to perform descriptive media content search based on the search query (e.g., the user query 120). In some embodiments, the descriptive media content search can identify media content (e.g., one or more media content items 234) that is most relevant to the descriptive terms (e.g., descriptors) in the user query 120. In other embodiments, other criteria can be used to determine media content responsive to the user query 120. An example method for performing such descriptive media content search is illustrated and described in more detail herein, for example with reference to FIG. 5.

At operation 306, the media delivery system 104 operates to provide the identified media content to the media playback device 102. In some embodiments, the media delivery system 104 operates to transmit media stream 232 for the identified media content to the media playback device 102 via the network 106.

Figure 4:
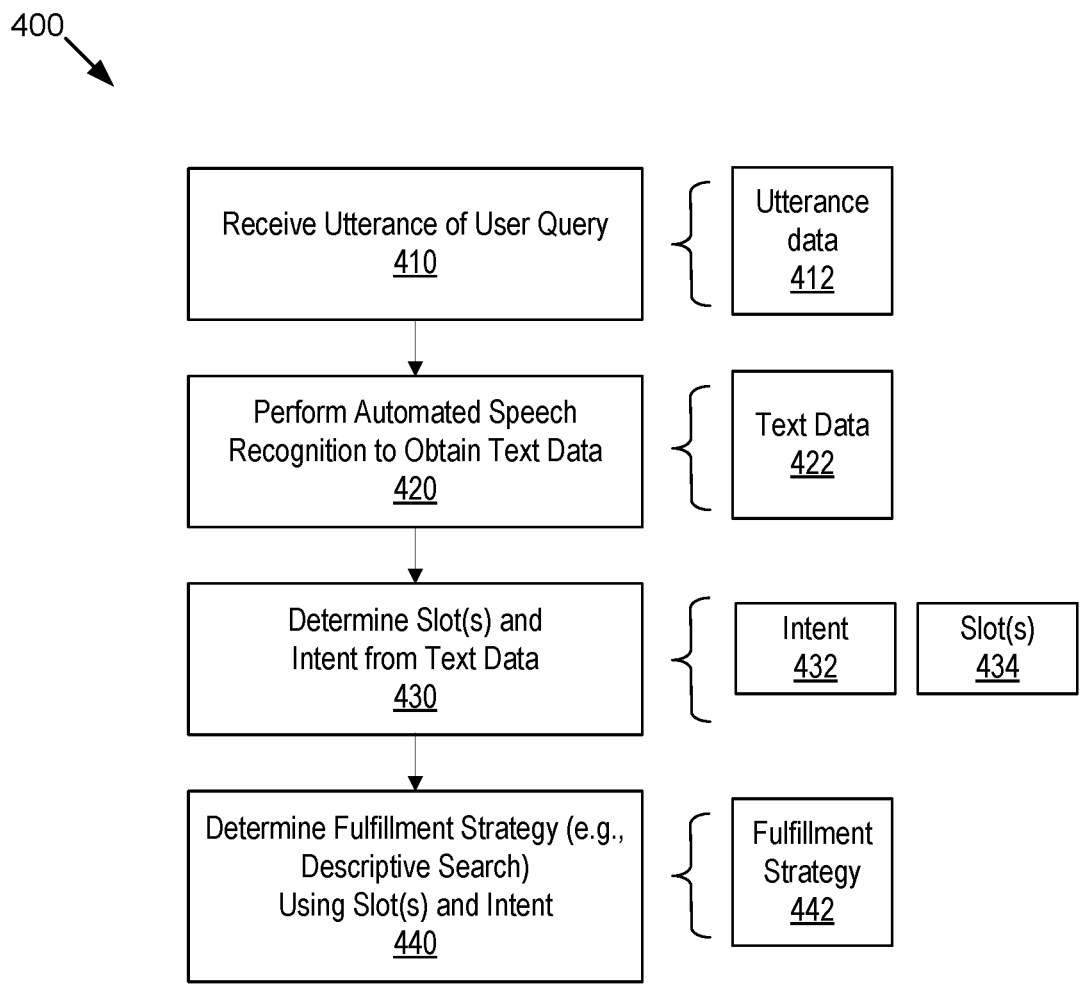
FIG. 4 is a flowchart of an example method for processing an utterance of the user query.

FIG. 4 is a flowchart of an example method 400 for processing an utterance of the user query 120. The method 400 can also be performed to determine a descriptive media content search service as a fulfillment strategy based on the utterance of the user query 120. In some embodiments, the method 400 can be used to at least partially perform the operation 302 of the method 300 in FIG. 3.

In some embodiments, the method 400 can be performed by the media delivery system 104. For example, the method 400 can be used by the natural language understanding (NLU) system (e.g., the NLU application 280) for performing a fulfillment strategy based on a received utterance. As described herein, the media delivery system 104 can include the user command interpretation server 206 that operates the NLU application 280, and the media playback device 102 can receive an utterance of the user query 120 and provide the utterance to the media delivery system 104 for processing at the user command interpretation server 206. This is for example purposes only, and other configurations are possible. For instance, the NLU application 280 is locally saved and performed in the media playback device 102.

The method 400 can begin at operation 410 in which the media delivery system 104 receives the utterance of the user query 120. The utterance of the user query 120 can be stored and received as utterance data 412 by the media delivery system 104. The utterance data 412 is data describing the utterance of the user query 120. In at least some embodiments, the utterance data 412 is an audio recording that contains the utterance being spoken. In some examples, the utterance data 412 is received as an entire audio data file. For instance, the media playback device 102 buffers the utterance data 412 as it is obtained from the sound detection device 162. The buffered utterance data 412 is then sent to the media delivery system 104 for processing. In other instances, the media playback device 102 streams the utterance data 412 to the media delivery system 104 in real-time as the utterance data 412 is received from the sound detection device 162 of the media playback device 102. In some examples, the utterance data 412 is stored (e.g., by the media delivery system 104) in a data store after it is received. After the utterance data 412 is received, the method 400 moves to operation 420.

Operation 420 includes performing automated speech recognition on the utterance data 412 to obtain text data 422. In some embodiments, performing automated speech recognition includes providing the utterance data 412 as input to an automated speech recognition system (e.g., the voice recognition application 270 of the voice interaction server 204) and receiving the text data 422 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION. After the text data 422 is obtained from the automated speech recognition system, the method 400 can move to operation 430.

Operation 430 includes determining a slot 434 and an intent 432 from the text data 422. The slot 434 is a key-value pair that describes a portion of the text data 422 having a specific meaning. The intent 432 describes a general intent of the text data 422. In the illustrated example of FIG. 1, if the text data 422 represents "play relaxing jazz for tonight" as input, the intent 432 is "play" and the slot 434 can include at least one key-value pair, such as {descriptor:relaxing} and {descriptor:tonight}. In another example, if the text data 422 includes "play Thriller" as input, the intent 432 is "play" and the slot 434 is a key-value pair of {song: Thriller}.

In some embodiments, the text data 422 can include a single slot 434 and a single intent 432. In other embodiments, the operation 430 can return a plurality of slots 434 and/or a plurality of intents 432 from the text data 422. In yet other embodiments, the text data 422 provides an intent 432 but no slot 434. For example, where the text data 422 is "play," the operation 430 can return the intent 432 being "play", but will not result in any slot 434 (e.g., the text data 422 does not include a description of what to play). In other examples, the text data 433 can include one or more slots 434 but no intent. For instance, where the text data 422 is "All Along the Watchtower by Jimi Hendrix," the operation 430 can result in two slots 434 (e.g., {Song: All Along the Watchtower} and {Artist: Jimi Hendrix}) but no intent 432 (e.g., the text data 422 does not include a description of what do to with the song and artist, such as search, play, or save).

As described herein, the text data 422 can include one or more descriptors. In some embodiments, the descriptors can include values of one or more of the slots 434 identified from the text data 422. In the illustrated example of FIG. 1, where the text data 422 includes "play relaxing jazz for tonight" converted from the utterance of the user query 120, the values of the slots 434, such as "relaxing," "relaxing jazz," and/or "tonight," can be included as descriptors of the text data 422. In other embodiments, the descriptors of the text data 422 can include the value of the intent 432 (e.g., "play" in the above example). In yet other embodiments, other terms identified in the text data 422 (e.g., "jazz") can be included in the descriptors of the text data 422. In yet other embodiments, the descriptors of the text data 422 can be identified in other methods.

In some embodiments, the operation 430 can be performed by a natural language understanding model that is trained to identify the slot 434 and intent 432 for the text data 422 provided as input. The natural language understanding model can be implemented in a variety of ways, including using a state vector machine or a conditional random fields model, among others. With the intent 432 and the slots 434 determined, the method 400 can move to operation 440.

Operation 440 includes determining a fulfillment strategy 442 using the slot 434 and the intent 432. The fulfillment strategy 442 is a course of action to be performed to execute a command or service associated with the utterance, such as the intent 432 thereof. As described herein, the fulfillment strategy 442 can include a descriptive search service in response to the user query 120. In another example, where the intent 432 is a play intent, the fulfillment strategy 442 is a play fulfillment strategy and involves execution of a play command.

In some embodiments, the media delivery system 104 includes a fulfillment manager that operates to select a fulfillment strategy 442 among a plurality of fulfillment strategies, which satisfies the received utterance. The plurality of fulfillment strategies can include a play fulfillment strategy, a basic search strategy (e.g., using entity-focused search), a descriptive search strategy, a recommendation strategy, and an unspecified search strategy. In some examples, the fulfillment manager follows a decision tree based on the intent 432 and the slot 434. In other examples, each fulfillment strategy 442 defines requirements (e.g., a play fulfillment strategy may require a play intent) and the fulfillment manager selects a fulfillment strategy among the plurality of fulfillment strategies based on whether the associated requirement is met.

Once the fulfillment strategy 442 is selected, the fulfillment strategy 442 is then performed by the media delivery system 104. For example, where the fulfillment strategy 442 is determined to be a descriptive search service based on the intent 432 and/or the slot 434 of the text data 422, the media delivery system 104 performs descriptive media content search based on the text data 422 (e.g., at least one of the descriptors identified from the text data 422).

Figure 5:
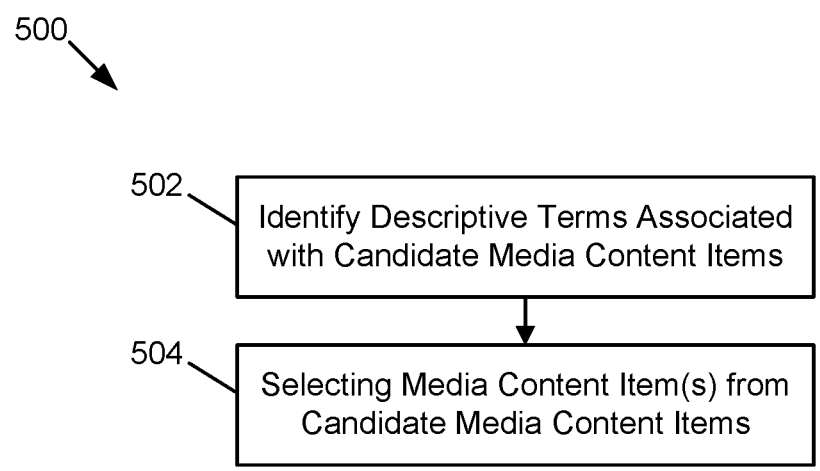
FIG. 5 is a flowchart of an example method for performing descriptive search for media content based on the user query.

FIG. 5 is a flowchart of an example method 500 for performing descriptive search for media content based on the user query 120. In some embodiments, the method 500 can be used to at least partially perform the operation 304 of the method 300 as illustrated in FIG. 3.

Figure 7:
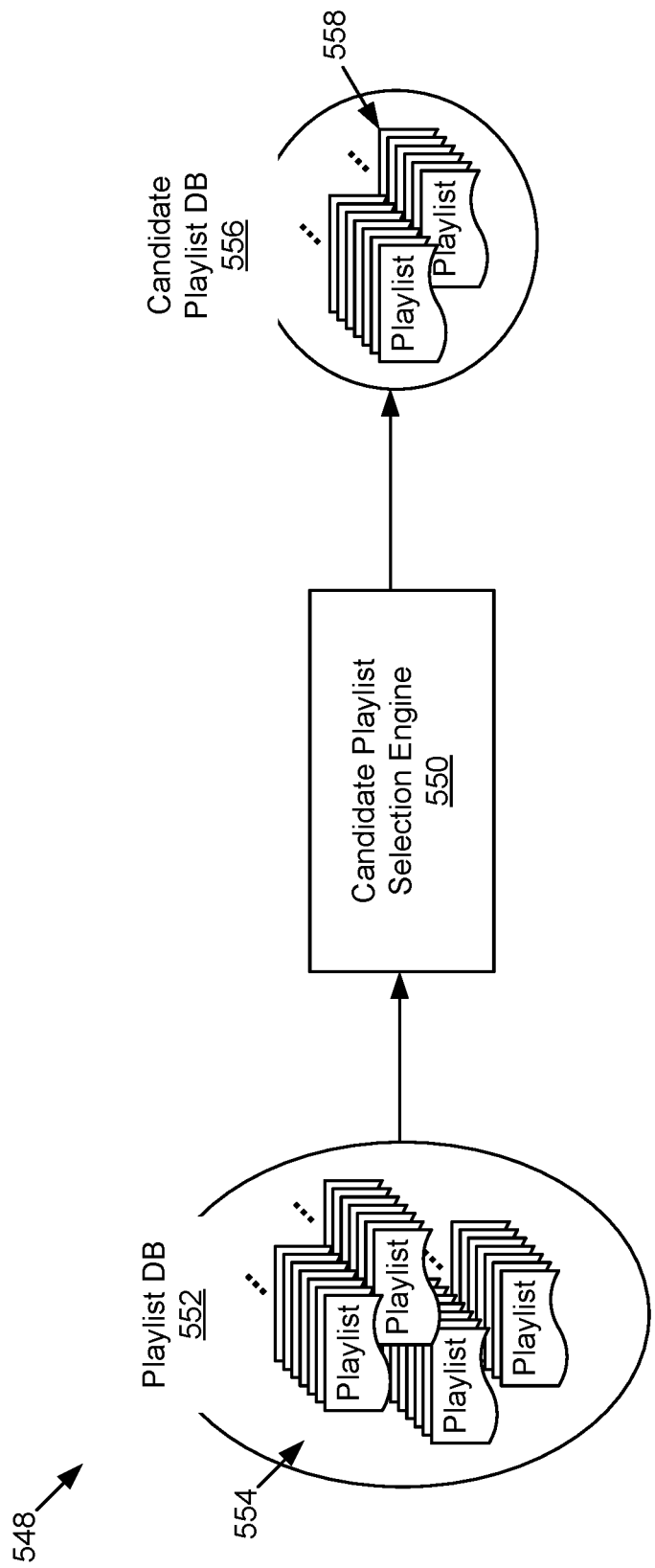
FIG. 7 illustrates an example method for determining candidate playlists.

At operation 502, the media delivery system 104 can operate to identify descriptive terms associated with candidate media content items. As described herein, the candidate media content items can include a subset of media content items from media content item database and are subject to the search in response to the user query 120. In some embodiments, the candidate media content items are obtained from candidate playlists 558 (FIG. 7).

In some embodiments, the operation 502 is performed to set up a descriptive search database that is to be utilized to conduct a descriptive search. In some embodiments, the operation 502 can be performed to build and store the descriptive search database prior to receiving the user query 120. In other embodiments, the operation 502 is performed upon receiving the user query 120. An example of the operation 502 is illustrated and described in more detail herein, for example with reference to FIG. 6.

At operation 504, the media delivery system 104 can operate to select one or more media content items from the candidate media content items. In some embodiments, the operation 504 is performed to utilize the descriptive search database and conduct a descriptive search based on one or more descriptors of the user query 120. An example of the operation 504 is illustrated and described in more detail herein, for example with reference to FIG. 12.

Figure 6:
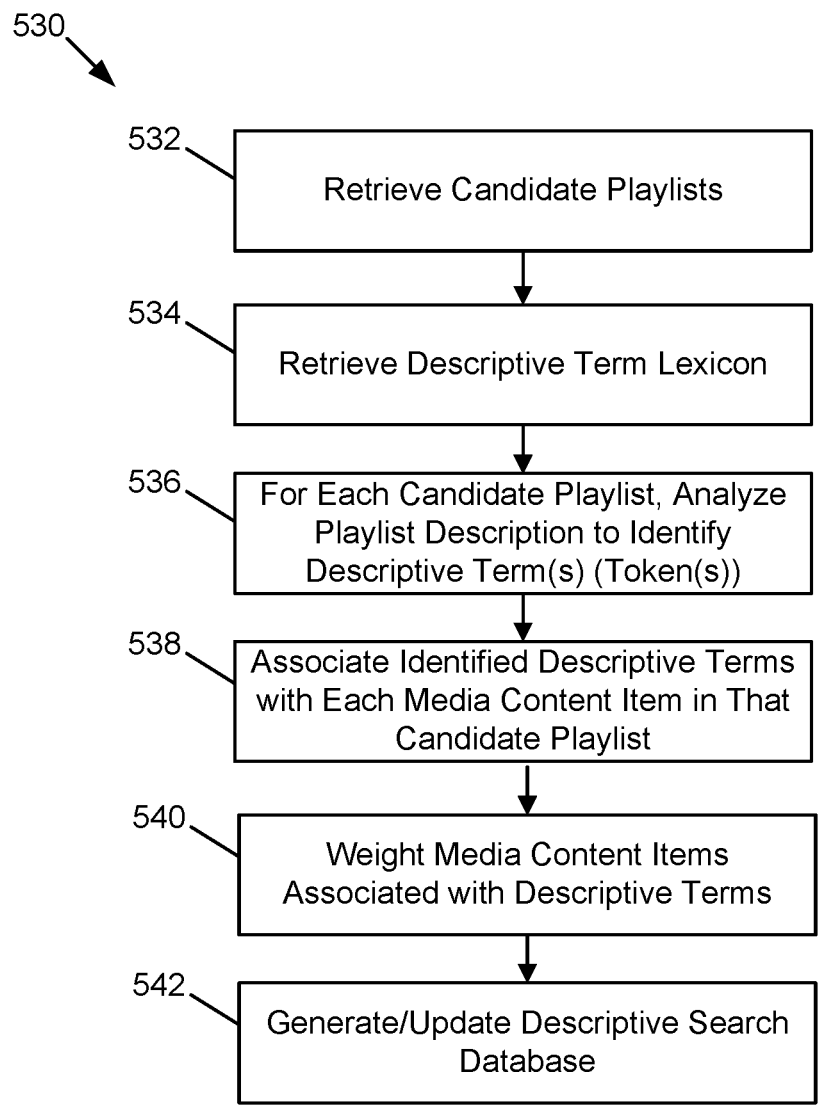
FIG. 6 is a flowchart of an example method for generating and updating descriptive search database.

FIG. 6 is a flowchart of an example method 530 for generating or updating descriptive search database. In some embodiments, the method 530 is used to at least partially perform the operation 502 as illustrated in FIG. 5. As described herein, the descriptive search database can be generated by identifying descriptive terms associated with media content items.

In general, the descriptive search solution according to an exemplary embodiment of the present disclosure utilizes a corpus of playlists, each of which contains a playlist description that describe the respective playlist. The playlist description of a playlist can be used to identify additional descriptive information about media content items in the playlist, and use that information to provide relevant search results.

At operation 532, the media delivery system 104 operates to retrieve candidate playlists 558 (FIG. 7). The candidate playlists 558 includes a subset of playlists selected from playlist database and subject to the search as described herein. An example of the operation 532 is illustrated and described in more detail herein, for example with reference to FIG. 7.

At operation 534, the media delivery system 104 operates to retrieve a descriptive term lexicon 560 as illustrated in FIG. 8. The descriptive term lexicon 560 includes a list of words or phrases that is prepopulated and used as a vocabulary to identify descriptive terms from playlist descriptions 570 in the candidate playlists 558 (including 558A, 558B, and 558C), as illustrated in FIG. 8. The descriptive term lexicon 560 can be used to clarify unclear terms in the playlist descriptions of the candidate playlists 558 and identify them as descriptive terms relevant to the descriptive search. In some embodiments, the descriptive term lexicon 560 can be manually created and updated. In other embodiments, the descriptive term lexicon 560 can be at least partially automatically created and updated using, for example, machine learning technology. An example of the operation 534 is illustrated and described in more detail herein, for example with reference to FIG. 8. The operation 534 can be optional and, in other embodiments, can be omitted from the method 530.

At operation 536, the media delivery system 104 operates to analyze a playlist description 570 of each candidate playlist 558 and identify one or more descriptive terms 572 (including 572A, 572B, and 572C) from the playlist description 570. In some embodiments, the playlist description 570 is analyzed using the descriptive term lexicon 560. In some embodiments, the playlist description 570 is tokenized into tokenized terms (e.g., tokens), and at least one of the tokenized terms can be determined as the descriptive terms 572. An example of the operation 536 is illustrated and described in more detail herein, for example with reference to FIG. 8.

At operation 538, the media delivery system 104 operates to associate the descriptive terms 572 identified from each candidate playlist 558 with each of the media content items 234 in the candidate playlist 558. The media content items 234 associated with the candidate playlist 558 can be identified by media content item identifications (IDs) 578.

As such, the descriptive terms 572 associated with the media content items are used as additional information descriptive of the media content items. An example association of the descriptive terms 572 with the media content items is illustrated and described in more detail herein, for example with reference to FIG. 9.

At operation 540, the media delivery system 104 operates to weight the media content items 234 associated with the descriptive terms 572. In some embodiments, each media content item 234 associated with a given descriptive term 572 can be weighted to provide an indication of how strongly the media content item 234 is associated with the descriptive term 572. In other embodiments, the weighting can also be based at least in part on how frequency the media content item 234 appears in the candidate playlists that contain the descriptive term 572 in the playlist description 570. In one example, a term frequency and inverse document frequency (TFIDF) weighting is used to compute a weighting score for each of the media content items 234 from the candidate playlists 558. An example of the operation 540 is illustrated and described in more detail herein, for example with reference to FIG. 10. The operation 540 can be optional and, in other embodiments, can be omitted from the method 530.

Figure 11:
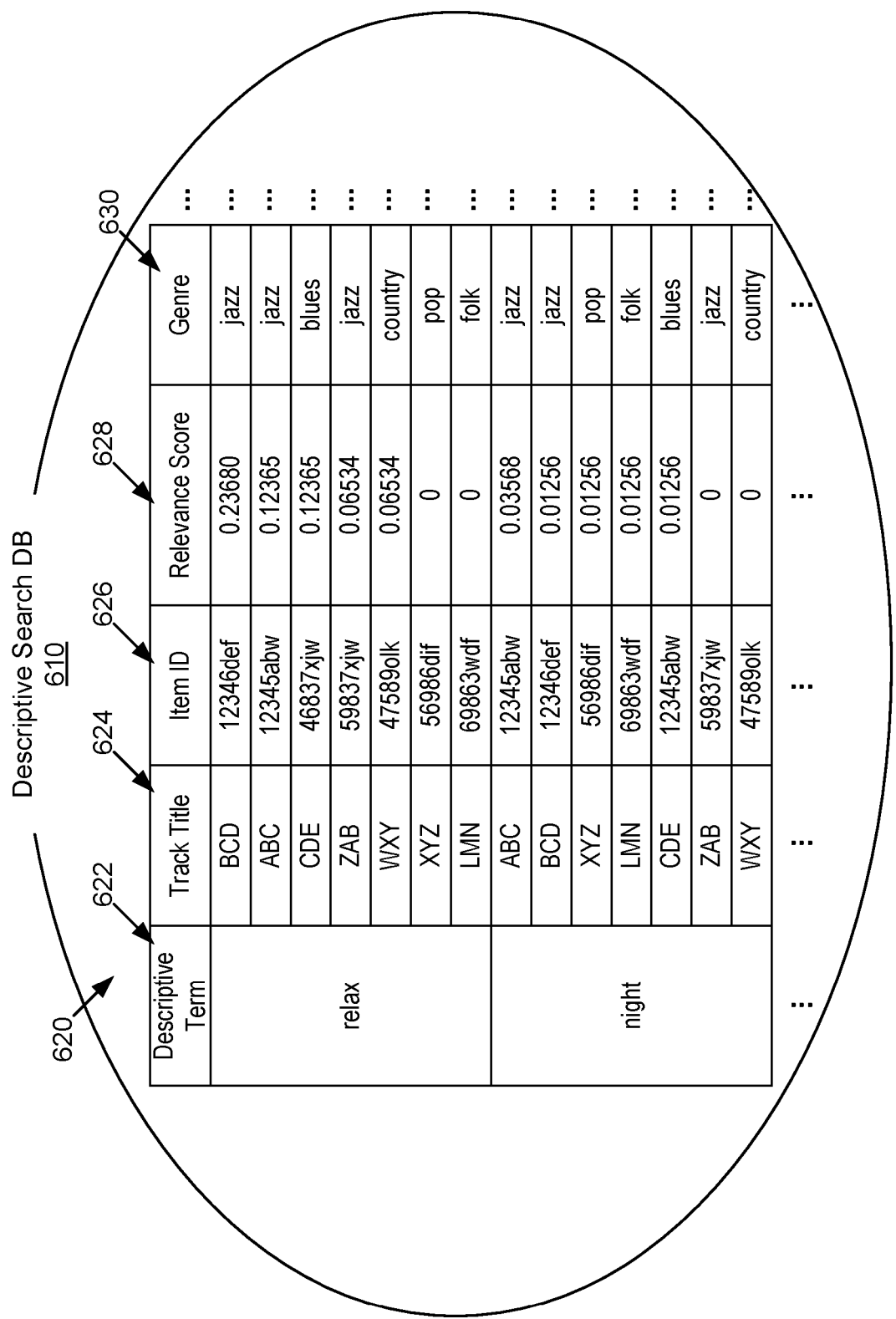
FIG. 11 illustrates an example descriptive search database.

At operation 542, the media delivery system 104 operates to generate and/or update a descriptive search database 610 (FIG. 11). When the descriptive terms 572 are identified, the descriptive terms 572 can be stored in the descriptive search database 610. In some embodiments, an inverted index is created to map the descriptive terms 572 to the media content items 234 in the candidate playlists 558. For example, the descriptive search database 610 stores each of the descriptive terms 572 and includes a list of media content items associated with that descriptive term 572. An example data structure of the descriptive search database 610 is illustrated and described in more detail herein, for example with reference to FIG. 11.

FIG. 7 illustrates an example method 548 for determining candidate playlists 558. In some embodiments, the method 548 is used to at least partially perform the operation 532 as described in FIG. 6.

In general, the method 548 can be performed to identify a subset of playlists from a playlist database 552. The playlist database 552 includes a plurality of playlists 554, which can include the playlists 239 as described in FIG. 2. The subset of playlists can be referred to herein as candidate playlists 558. In some embodiments, a candidate playlist database 556 is created to store the candidate playlists 558. The method 548 is designed to filter out some of the playlists 554 in the playlist database 552 that have less coherent or suitable to be used for descriptive search. By way of example, some of the playlists 554 in the playlist database 552 can have no or little playlist description, or playlist descriptions with no meaningful information that characterize the playlists. These playlists 554 in the playlist database 552 are not useful for performing the method 530 as described herein. The method 548 is performed to select candidate playlists 558 that are meaningful, suitable playlists that can lead to relevant search results in response to the user query 120.

In some embodiments, the method 548 can be performed at least by a candidate playlist selection engine 550 that can be included in the media delivery system 104. The candidate playlist selection engine 550 can operate to retrieve the playlists 554 stored in the playlist database 552. In other embodiments, only some of the playlists 554 in the playlist database 552 are retrieved.

The candidate playlist selection engine 550 can use one or more various algorithms to select candidate playlists 558. In some embodiments, a heuristic technique can be used to select candidate playlists 558 from the playlists 554. In other embodiments, the candidate playlists 558 can be selected based on a predetermined rule.

The candidate playlists 558 in the candidate playlist database 556 can be updated as the playlists 554 in the playlist database 552 change. For example, the playlists 554 can change in the playlist database 552 as users create new playlists, edit or remove existing playlists, and add, remove, and modify media content items in existing playlists. In some embodiments, the candidate playlists 558 can be updated periodically, in real-time, and/or at preset times.

FIG. 8 illustrates an example method 562 for identifying one or more descriptive terms 572 from the candidate playlists 558. In some embodiments, the method 562 is used to at least partially perform the operations 534 and 536 as described in FIG. 6.

As described herein, a candidate playlist 558 has a playlist description 570. In some embodiments, the playlist description 570 includes a playlist title 574 and a descriptive text 576. As described herein, the playlist title 574 is a name of the playlist, which can be created either by a user or by a media streaming service provider (either manually or automatically). The descriptive text 576 can include words, phrases, or sentences that characterize the candidate playlist 558. The descriptive text 576 can be obtained from various sources. In some examples, a user can provide the descriptive text 576. In other examples, the descriptive text 576 can be obtained from external sources, such as user or expert opinions or feedback (e.g., reviews or genre labels through websites, chatrooms, blogs, surveys, and the like), statistics (e.g., sales data), or any text information that may be used to describe, rank, or interpret the playlist or music associated with the playlist. In some embodiments, the descriptive text 576 can also be generated by a community of listeners and automatically retrieved from Internet sites, chat rooms, blogs, and the like.

For each candidate playlist 558, the playlist description 570 can be analyzed to identify one or more descriptive terms 572. In some embodiments, the playlist description 570 is tokenized into tokenized terms (e.g., tokens), at least some of which are determined as descriptive terms 572. For example, for a given candidate playlist 558, the playlist description 570 is analyzed such that one or more keywords in the playlist description 570 are identified and stored as tokens. In some embodiments, the descriptive term lexicon 560 is used in identifying keywords from the playlist description 570 and determining the keywords as the descriptive terms 572.

By way of example, in the illustrated example of FIG. 8, a first candidate playlist 558A contains a playlist description 570 including a playlist title 574 ("Relaxing Night") and a descriptive text 576 ("Great for relaxation afterwork"). The media delivery system 104 can process (e.g., tokenize) the playlist description 570 to identify keywords, such as "relaxing," "night," "great," "relaxation," and "afterwork" and generate tokens for such keywords and/or their variants. At least one of the tokens can be included in the descriptive terms 572A for the first candidate playlist 558A. Second and third candidate playlists 558B and 558C are similarly analyzed to generate the descriptive terms 572B and 572C, respectively.

The playlist description 570 can be tokenized in various ways. In some embodiments, the playlist description 570 can be tokenized by a single word. In other embodiments, the playlist description 570 can be tokenized by a combination of adjacent words if such adjacent words are determined to be related. Other methods are also possible.

FIG. 9 illustrates an example data structure 580 that associates the descriptive terms 572 with media content items 234. In some embodiments, the data structure 580 is generated from the operation 538 as illustrated in FIG. 6.

In some embodiments, the data structure 580 is configured as a data table having an item title column 582, an item ID column 584, a playlist ID column 586, a descriptive term column 588, and one or more metadata columns 590. The item title column 582 shows the titles of the media content items 234. The item ID column 584 shows the ID (e.g., a uniform resource identifier (URI)) of the media content items 234. The playlist ID column 586 shows the IDs of the playlists that contain respective media content items 234. The descriptive term column 588 shows the descriptive terms 572 associated with respective media content items 234. As described herein, the descriptive terms 572 for a given media content item 234 can be identified from the playlists (e.g., the candidate playlists 558) containing that media content item 234.

As illustrated, each of the media content items 234 from the candidate playlists 558 are associated with the descriptive terms 572 identified from the candidate playlists 558. By way of example, a media content item 234 titled "ABC" is identified as item ID "123456abw" and can be associated with the descriptive terms, "relax" or its variants (e.g., "relaxing" or "relaxation"), "great," "night" or its variants (e.g., "tonight"), "afterwork," "kid," "favorite," and "good," which are identified from the candidate playlists 558A, 558B, and 558C. This media content item 234 is associated with the descriptive term "relax" or its variants twice from the candidate playlists 558A, 558B, and 558C, and also associated with the descriptive term "night" or its variants twice from the candidate playlists 558A, 558B, and 558C.

The association of the descriptive terms 572 identified from the candidate playlists 558 with the media content items 234 in the candidate playlists 558 provides additional descriptive information to the media content items 234. The idea of this association is that the descriptive terms of a playlist is an indication of the characteristics of the media content items contained in that playlist. Therefore, a playlist description of a playlist can suggest the characteristics of the media content items in the playlist.

In some embodiments, the data structure 580 also includes at least part of the information from metadata (e.g., the metadata 236 (FIG. 2)) of the media content items 234. Such metadata information is shown in one or more of the metadata columns 590. In the illustrated example of FIG. 9, the metadata columns 590 includes a column for genre of the media content items 234.

Figure 10:
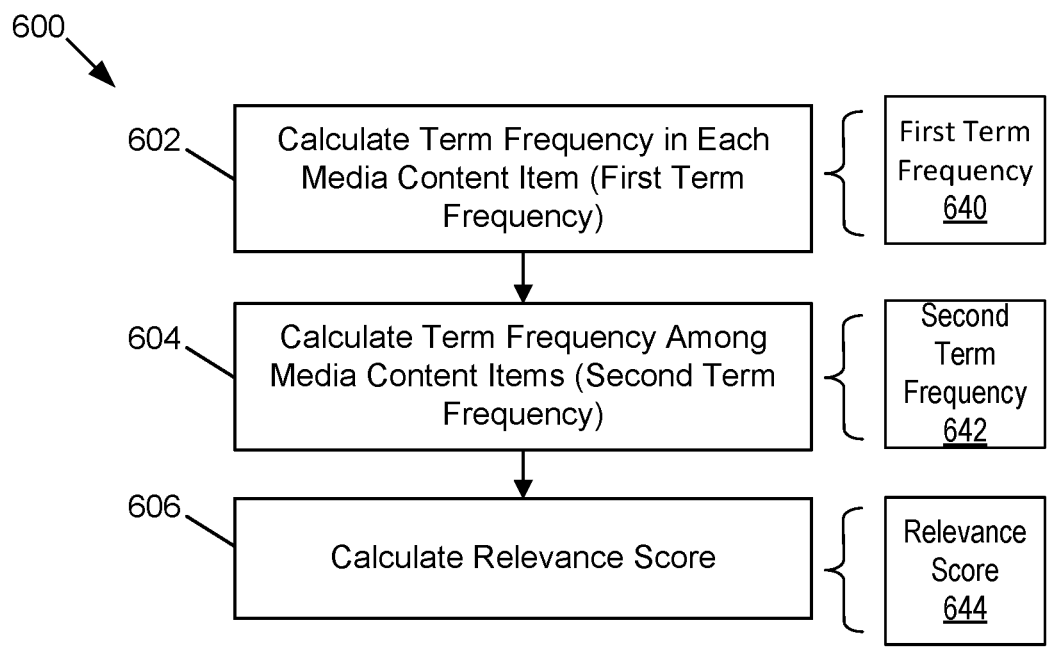
FIG. 10 is a flowchart of an example method for weighting the media content items associated with the descriptive terms.

FIG. 10 is a flowchart of an example method 600 for weighting the media content items 234 associated with the descriptive terms 572. In some embodiments, the method 600 is used to at least partially perform the operation 540 as described in FIG. 6. In some embodiments, the method 600 can be performed based on the data that map the media content items 234 to the descriptive terms 572, such as shown in the data structure 580 in FIG. 9.

In some embodiments, the method 600 can be used to compute how relevant a given media content item 234 is to the user query 120. The method 600 can provide a solution to ranking the media content items 234 in view of the user query 120. In some embodiments, the method 600 can determine how relevant or important a given descriptive term is to a given media content item 234 among a plurality of media content items 234.

The method 600 can begin at operation 602 in which the media delivery system 104 operates to calculate a first term frequency 640. The first term frequency 640 is a term frequency in each of the media content items 234. The first term frequency 640 is a measure of how frequently a particular term (e.g., a descriptive term) appears in a document (e.g., a media content item). In some embodiments, the first term frequency (TF) 640 can be computed as:

$$TF \text{ (descriptive term, media content item)} = \frac{\text{Number of times the descrptive term appears in the media content item}}{\text{Total number of desciptive terms in the media content item}}$$

At operation 604, the media delivery system 104 operates to calculate a second term frequency 642. The second term frequency 642 is a measure of how frequently a particular term (e.g., a descriptive term) appears in all documents (e.g., all candidate media content items). In some embodiments, the second term frequency (IDF) 642 can be computed as:

$$IDF \text{ (descriptive term)} = \ln\left(\frac{\text{Total number of media content items}}{\text{Number of media content items containing the term}}\right)$$

It is noted that IDF=0 if the term does not appear in any media content item.

At operation 606, the media delivery system 104 operates to calculate a relevance score 644 based on the first term frequency 640 and the second term frequency 642. The relevance score 644 is a measure of how relevant a particular term (e.g., a descriptive term) is to a document (e.g., a media content item). In some embodiments, the relevance score 644 can be computed as:

Relevance Score(descriptive term,media content item)=TF(descriptive term,media content item)× IDF(descriptive term)

In some embodiments, the method 600 implements a term frequency and inverse document frequency (TFIDF) weighting. In other embodiments, other weighting algorithms can be used for the method 600.

FIG. 11 illustrates an example of the descriptive search database 610. In some embodiments, the descriptive search database 610 is generated and/or updated at least partially by the operation 542 as described in FIG. 6.

In some embodiments, the descriptive search database 610 includes an inverted index structure 620 that maps the descriptive terms 572 to the media content items 234 that are contained in the candidate playlists 558. Other indexing methods are also possible in the descriptive search database 610.

In some embodiments, the inverted index structure 620 is configured as a data table having a descriptive term column 622, an item title column 624, an item ID column 626, a relevance score column 628, and one or more metadata columns 630. The descriptive term column 622 includes the descriptive terms 572 identified from the candidate playlists 558. The item title column 624 shows the titles of the media content items 234. The item ID column 626 shows the ID (e.g., a uniform resource identifier (URI)) of the media content items 234. The relevance score column 628 includes relevance scores calculated for each descriptive term 572 with respect to each media content item 234. In some embodiments, the relevance scores can be obtained by the method 600 as described in FIG. 10. The metadata columns 630 includes at least part of the information from metadata (e.g., the metadata 236 (FIG. 2)) of the media content items 234. As described herein, the metadata of the media content items 234 can be additionally used to improve the search results.

Figure 12:
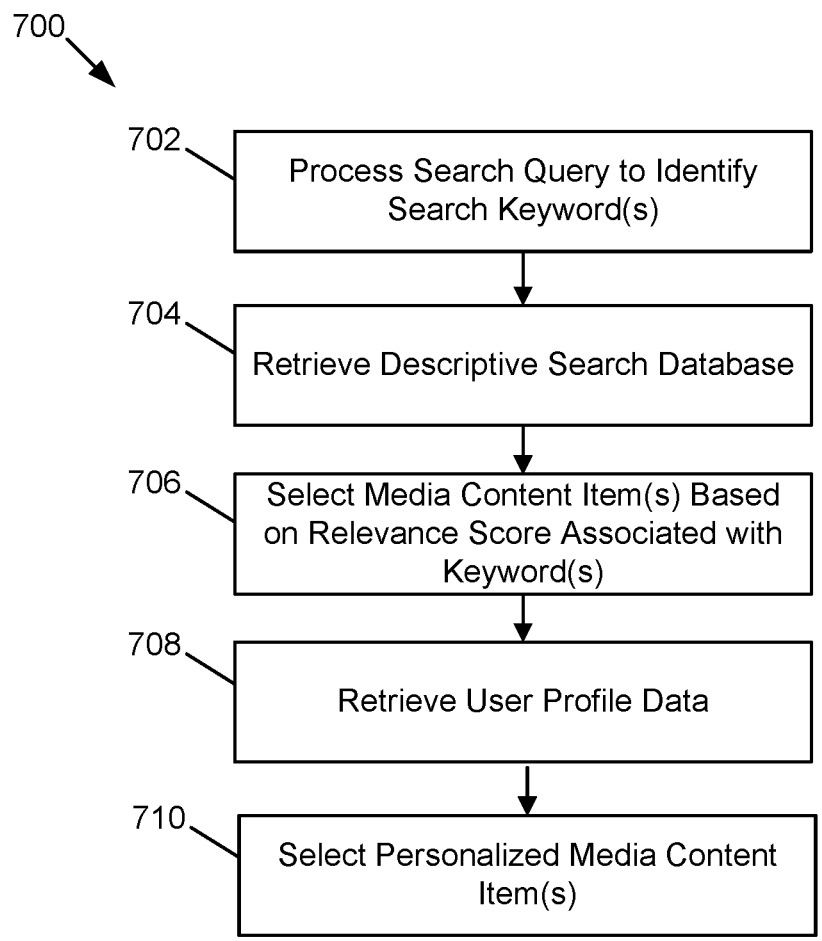
FIG. 12 is a flowchart of an example method for performing a descriptive search from the descriptive search database.

FIG. 12 is a flowchart of an example method 700 for performing a descriptive search from the descriptive search database 610. In some embodiments, the method 700 is used to at least partially perform the operation 504 as illustrated in FIG. 5.

In some embodiments, the method 700 is used to select one or more media content items from the candidate media content items (e.g., the media content items from the candidate playlists 558) by utilizing the descriptive search database and conducting a descriptive search based on one or more descriptors of the user query 120.

Figure 13:
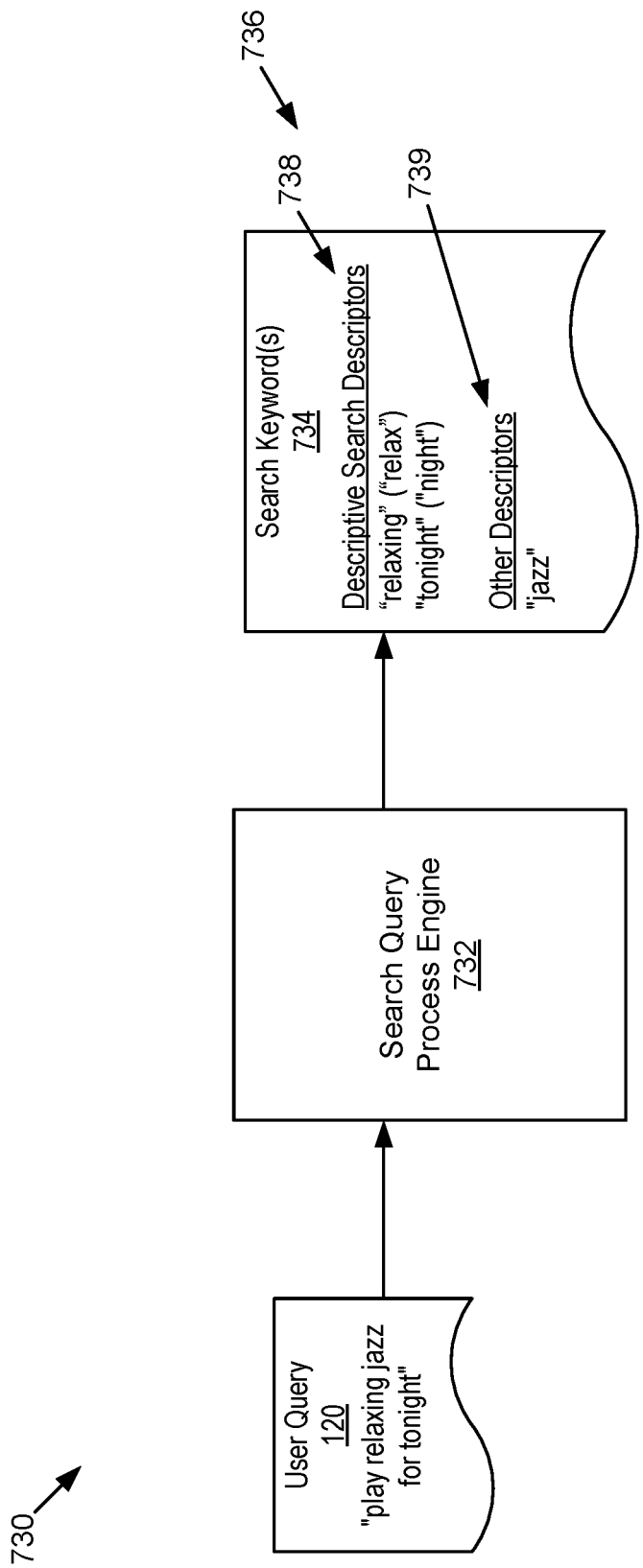
FIG. 13 illustrates an example method for analyzing the user query to identify one or more search keywords.

The method 700 can begin at operation 702 in which the media delivery system 104 operates to process the user query 120 to identify one or more search keywords 734 (FIG. 13). In some embodiments, the user query 120 is analyzed to identify one or more descriptors 736, and one or more of the descriptors 736 from the user query 120 can be used for one or more search keywords 734. An example of the operation 702 is illustrated and described in more detail herein, for example with reference to FIG. 13.

At operation 704, the media delivery system 104 retrieves the descriptive search database 610. At operation 706, the media delivery system 104 operates to select one or more media content items 740 (FIG. 14) (also referred to herein as output media content items or the like) based on the relevance score 644 associated with the search keywords 734. An example of the operations 704 and 706 is illustrated and described in more detail herein, for example with reference to FIG. 14.

Figure 15:
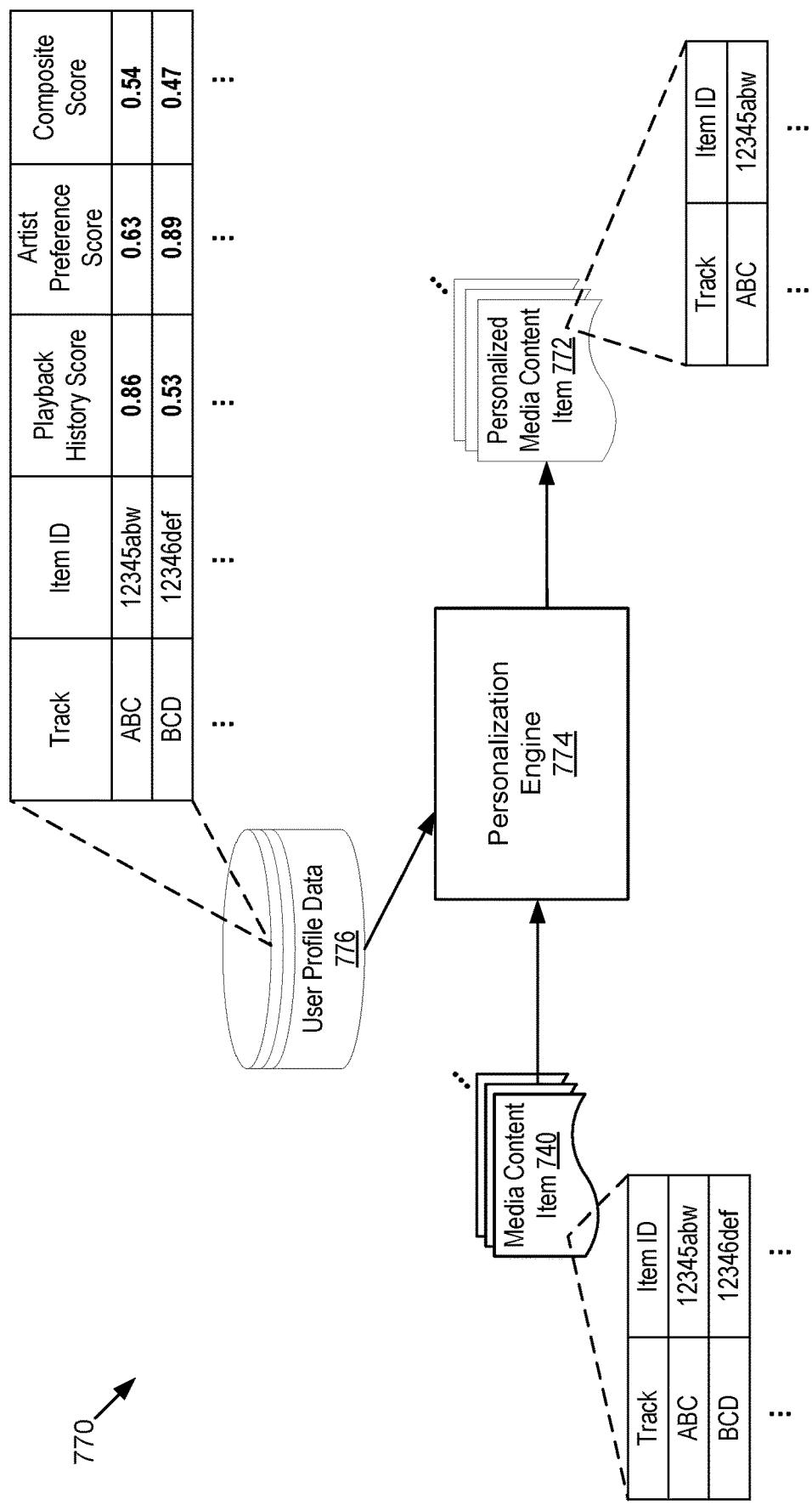
FIG. 15 illustrates an example method for selecting personalized media content items.

At operation 708, the media delivery system 104 retrieves user profile data 776 (FIG. 15). At operation 710, the media delivery system 104 operates to select one or more personalized media content items 772 based on the user profile data 776. An example of the operations 708 and 710 is illustrated and described in more detail herein, for example with reference to FIG. 15.

In some embodiments, at least one of the operations 702, 704, 706, 708, and 710 is performed prior to the operation 502 as illustrated in FIG. 5 while the rest of the operations 702, 704, 706, 708, and 710 follows the operation 502. In other embodiments, the operations 702, 704, 706, 708, and 710 are performed after the operation 502 as illustrated in FIG. 5.

FIG. 13 illustrates an example method 730 for analyzing the user query 120 to identify one or more search keywords 734. In some embodiments, the method 730 is used to at least partially perform the operation 702 as described in FIG. 12. As described herein, the user query 120 is a text query that is typed by the user, or a voice request (e.g., an utterance) received through a microphone and converted into a text query.

In some embodiments, the method 730 can be performed at least by a search query process engine 732 that can be included in the media delivery system 104. The search query process engine 732 can operate to analyze the user query 120 and generate the search keywords 734. In some embodiments, the user query 120 is tokenized into tokenized terms (e.g., words or phrases), which include descriptors 736. At least one of the descriptors 736 can be used as the search keywords 734.

By way of example, the user query 120 is a search request "play relaxing jazz for tonight." The search query process engine 732 operates to process the user query 120 and identify the search keywords 734, such as "relaxing" (or its variants), "tonight" (or its variants), "jazz" (or its variants), etc.

In some embodiments, the search keywords 734 include at least one of the descriptors 736 from the user query 120, such as descriptive search descriptors 738 and other descriptors 739. In some embodiments, the descriptive search descriptors 738 are primarily used to perform a descriptive search as described herein. The other descriptors 739 can be used to perform other types of search, such as entity-focused search using media content metadata. As described herein, the other descriptors 739 can be used in addition to the descriptive search descriptors 738 to improve the search results from the descriptive search responsive to the user query 120.

In some embodiments, the search query process engine 732 refers to the descriptive search database 610 to identify the search keywords 734 by checking to see if any of the tokenized terms (or the descriptors) in the user query 120 match any of the descriptive terms in the descriptive search database 610. If so, such tokenized terms from the user query 120 are identified as search keywords to be used in the descriptive search.

Figure 14:
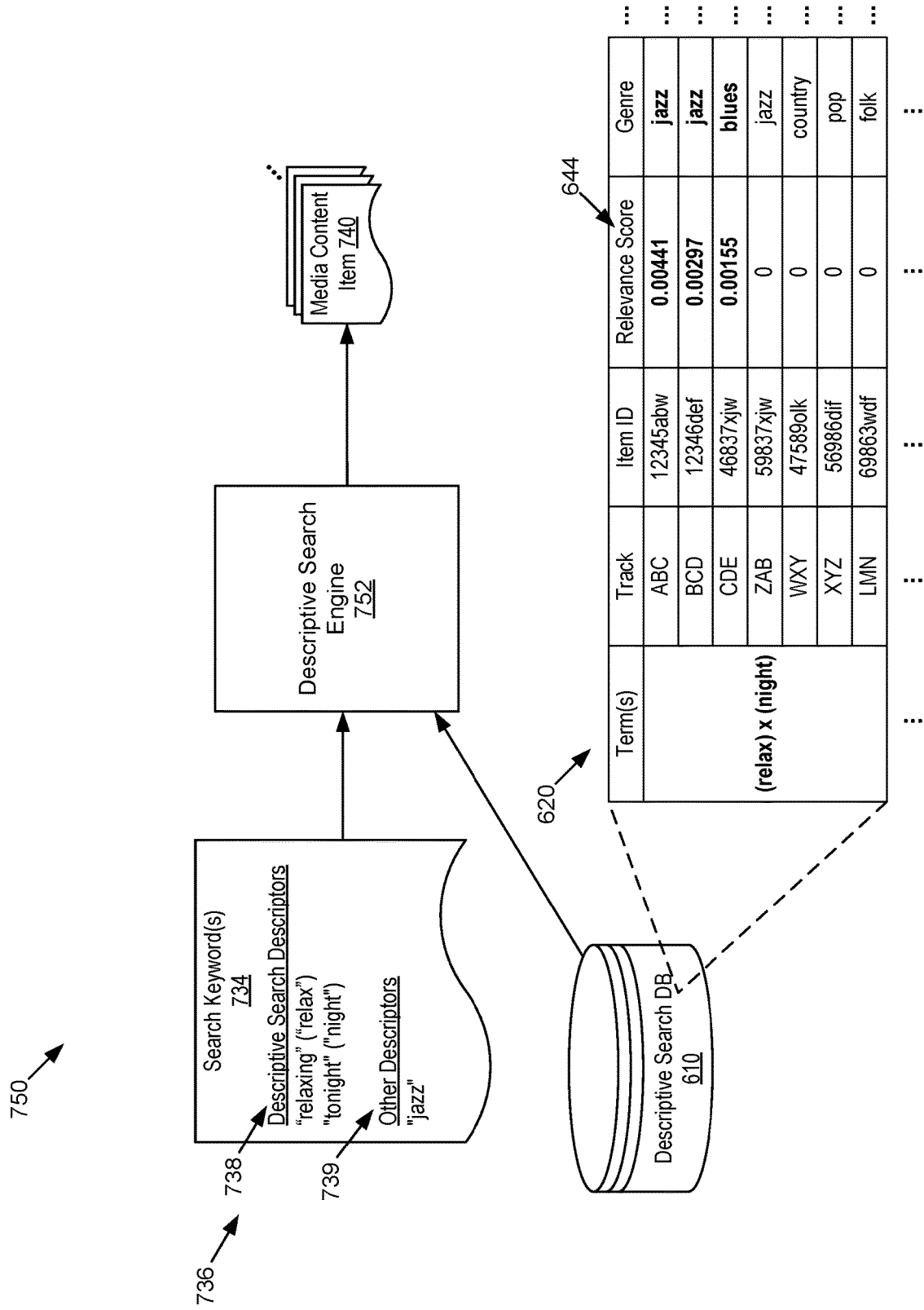
FIG. 14 illustrates an example method for selecting media content items based on descriptive search utilizing the descriptive search database.

FIG. 14 illustrates an example method 750 for selecting media content items 740 based on descriptive search utilizing the descriptive search database 610. In some embodiments, the method 750 is used to at least partially perform the operations 704 and 706 as described in FIG. 12.

In some embodiments, the method 750 can be performed at least by a descriptive search engine 752 that can be included in the media delivery system 104. The descriptive search engine 752 can process the search keywords 734 based on the descriptive search database 610 and return one or more media content items 740 that match the user query 120.

In some embodiments, the descriptive search engine 752 selects the media content items 740 based on the relevance score 644. For example, the media content items 740 are selected to match the search keywords 734 and have the highest relevance scores 644. In some embodiments, a predetermined number of media content items 740 are selected having the highest relevance scores 644 (e.g., top 10 media content items). In other embodiments, the number of media content items 740 are determined based on other factors, such as a relevance score threshold.

In other embodiments, the descriptive search engine 752 can employ other algorithms to select the media content items 740 in response to the user query 120. For example, the descriptive search engine 752 can operate to obtain a relevance score vector for each of the media content items 234 from the candidate playlists 558. Further, the descriptive search engine 752 can operate to obtain a corresponding vector for the user query 120. Then, the descriptive search engine 752 operates to compare each of the relevance score vectors for the media content items 234 with the corresponding vector for the user query 120, and determine similarity based on the comparison. In some embodiments, cosine similarity can be used to determine the similarity between the vectors. The descriptive search engine 752 can select media content items 740 having relevance score vectors with the highest similarities with the corresponding vector for the user query 120. Other algorithms are also possible in other embodiments.

In some embodiments, where a plurality of search keywords 734 are used for search, the relevance score 644 for a media content item containing the plurality of search keywords 734 can be computed by multiplication of individual relevance scores 644 for each of the search keywords 734 associated with the media content item. An example of this case is illustrated with the table 620 in FIG. 14.

In some embodiments, the descriptive search engine 752 can utilize other information about the media content items 234, such as information from metadata (e.g., the metadata 236) of the media content items 234, to provide even more relevant search results. In the illustrated example of FIG. 14, genre information of the media content items 234 are used in view of the other descriptors 739 (e.g., "jazz") in the search keywords 734. For example, in addition to the descriptive search described herein, the descriptive search engine 752 can further operate to search for media content items 234 having information from the metadata that matches the other descriptors 739 of the search keywords 734. As such, the metadata of media content items 234 can improve the search results from the descriptive search. By way of another example, where a search query includes a combination of descriptive search terms and other typical descriptors, such as "play some relaxing jazz music by Miles Davis," in which case the typical music search algorithm (e.g., using media content item metadata) can be used to identify music by Miles Davis, and the descriptive search algorithm can be used to identify "relaxing" music by the same artist.

FIG. 15 illustrates an example method 770 for selecting personalized media content items 772 from the media content items 740. In some embodiments, the method 770 is used to at least partially perform the operations 708 and 710 as described in FIG. 12.

In some embodiments, the method 770 can be performed at least by a personalization engine 774 that can be included in the media delivery system 104. The personalization engine 774 can select media content items that are personalized to the user based at least in part on user profile data 776. As such, the method 770 enables the search results to be personalized based on the user profile data 776.

In some embodiments, the personalization engine 774 utilizes the user profile data 776 to select one or more media content items from the media content items 740 that are selected by the descriptive search as described herein. The personalization engine 774 then outputs the selected media content items as personalized media content items 772.

In some embodiments, the user profile data 776 include user information. The user information can include one or more user specific features that can be used to determine media content personalized to respective users. The user specific features can represent the user's preference, media content consumption history, and/or other general features associated with the user of the media playback device 102. A few examples of user specific features include various user media content consumption activities (e.g., listening activities), such as the most listened context (e.g., track, album, artist, playlist, etc.), the most preferred context (e.g., track, album, artist, playlist, etc.), and the most preferred genre or other acoustic feature. The user specific features can be obtained based on the user's long-term activities (e.g., over a few months, a year or longer, etc.) or short-term activities (e.g., over a year or less, a month, a week, etc.).

In some embodiments, the user information includes user biographical information and user taste profile information. The user biographical information include features relating to personal information of respective users, such as address, age, gender, birth date/year, family, relationships, profession, education, religious preference, sexual preference, association, and other information associated with users. In some embodiments, the user biographical information can be obtained at least partially from the user account information.

The user taste profile information include features that can be obtained from taste profiles 242 of respective users, which represent the user's activities with respect to media content consumption, such as user preferences and history of consuming media content, as described herein. As described herein, the user taste profile information includes a user listening history, and other user-related data that can be used to personalize the search results. In some embodiments, the user taste profile information can further include taste profiles of other users having similar tastes.

As illustrated in FIG. 15 as an example, the user profile data 776 can provide scores of one or more user activities with respect to each of the media content items 740 (e.g., "ABC" and "BCD"). By way of example, the user profile data 776 for the particular user provides a playback history score for each media content item 740 to represent how often the user has played the media content item 740. The user profile data 776 can also provide an artist preference score to represent how much the user likes the artist of each of the media content items 740. In some embodiments, where a plurality of scores are considered, the user profile data 776 can provide a single score ("Composite Score") that represents all the scores. In some embodiments, such a single score can be calculated by multiplication of the plurality of scores.

Although the systems and the methods according to the present disclosure are primarily described to return media content items 740 or 772 as output, it is also possible that the systems and the methods are similarly configured to generate other types of media content, such as media contexts (e.g., playlists, albums, artists, etc.), as output.

In certain examples, an exemplary embodiment of the present disclosure operate to receive an utterance from a voice-enabled device. The embodiment can analyze a text version of the utterance to determine one or more descriptors in the utterance. The embodiment can optionally sort out a subset of playlists from a corpus of playlists in database based on one or more criteria (e.g., playlist size, time since last modified, various patterns to the playlist title, and other criteria). For each of the subset of playlists, the embodiment can tokenize the playlist title and/or other description into terms. For each of the subset of playlists, the embodiment can tag the media content items in the playlist with the tokenized terms so that the media content items are regarded as keys for the tokenized terms. The embodiment can aggregate the tags in each of the media content items in the entire subset of playlists. For example, the embodiment can group by the media content items to collect all the tokenized terms (including duplicates) associated with each of the media content items. The embodiment can apply term frequency and inverse document frequency (TFIDF) to weight the tokenized terms among the different media content items. The embodiment can generate an inverted index that maps the tokenized terms to the media content items. The embodiment can perform search for media content items using the inverted index based on the descriptors in the utterance. For example, the search can be performed by comparing the descriptors in the utterance with the tokenized terms in the inverted index, and then determining one or more of the tokenized terms in the inverted index and identifying the media content items associated with the determined tokenized terms. The embodiment can then return the identified media content items to the voice-enabled device for playback or other controlling of playback.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for providing relevant media content, the method comprising:
    assigning, by a media delivery system having one or more servers, descriptive terms to media content items by:
        accessing a playlist database hosted on at least one of the one or more servers, the playlist database storing playlists, each playlists having a playlist description and a list of media content item IDs, the media content item IDs being associated with the media content items;
        identifying a plurality of playlists from the playlist database; and
        for each of the plurality of playlists:
            tokenizing the playlist description into one or more tokenized terms; and
            associating each of the media content item IDs in the playlist with tokenized terms by assigning the one or more tokenized terms to each of the media content item IDs in a descriptive search database, wherein at least one media content item ID is assigned at least one tokenized term from more than one of the plurality of playlists;
    identifying, by the media delivery system, one or more media content items based on the tokenized terms assigned to the media content item IDs in the descriptive search database, wherein at least one identified media content item is identified based on the tokenized terms from more than one playlist being assigned to the at least one media content item ID from more than one of the plurality of playlists; and
    transmitting, from the media delivery system, a media stream for the one or more media content items to a media playback device.

2. The method of claim 1, wherein identifying the plurality of playlists further includes filtering out at least some of the playlists based on the playlist descriptions.

3. The method of claim 1, wherein assigning descriptive terms to the media content items further comprises: for each media content item ID in the plurality of playlists, weighting the media content items associated with the tokenized terms; and wherein identifying the one or more media content items is based on the tokenized terms and the weighting of the tokenized terms.

4. The method of claim 3, wherein weighting is performed using term frequency and inverse document frequency (TFIDF).

5. The method of claim 3, further comprising: after weighting the media content items associated with the tokenized terms, generating an inverted index that stores associations between the media content items with the tokenized terms.

6. The method of claim 1, further comprising:
    calculating a first term frequency, the first term frequency associated with a frequency of each of the tokenized terms appearing in each of the media content items;
    calculating a second term frequency, the second term frequency associated with a frequency of each of the tokenized terms appearing in all of the media content items; and
    calculating a relevance score based on the first term frequency and the second term frequency, the relevance score representative of relevancy of each of the tokenized terms to each of the media content items.

7. The method of claim 6, wherein identifying the one or more media content items is further based, at least in part, on the relevance score.

8. The method of claim 1, wherein the playlist description includes a playlist title and a descriptive text.

9. The method of claim 8, wherein the descriptive text is obtained from at least one of user reviews, expert reviews, and statistics.

10. The method of claim 1, further comprising:
    retrieving a user profile associated with a user; and
    determining personalized media content items from the identified one or more media content items based on the user profile.

11. The method of claim 1, further comprising:
    retrieving a descriptive term lexicon, wherein the playlist description is tokenized into the one or more tokenized terms based on the descriptive term lexicon.

12. The method of claim 1, further comprising:
retrieving metadata of media content items of the playlists, wherein the one or more media content items are identified from the plurality of playlists based in part on the metadata.

13. A media delivery system for selecting and providing media content responsive to a user query, the media delivery system comprising:
one or more servers including:
at least one processing device; and
at least one data storage device storing instructions executable by the at least one processing device to cause the media delivery system to:
access a playlist database hosted on at least one of the one or more servers, the playlist database storing playlists, each playlists having a playlist description and a list of media content item IDs, the media content item IDs being associated with media content items;
identify a plurality of playlists from the playlist database;
for each of the plurality of playlists:
tokenize the playlist description into one or more tokenized terms; and
associate each of the media content item IDs in the playlist with tokenized terms by assigning the one or more tokenized terms to each of the media content item IDs in a descriptive search database, wherein at least one media content item ID is assigned at least one tokenized term from more than one of the plurality of playlists;
identify one or more media content items based on the tokenized terms assigned to the media content item IDs in the descriptive search database, wherein at least one identified media content item is identified based on the tokenized terms from more than one playlist being assigned to the at least one media content item ID from more than one of the plurality of playlists; and
transmit a media stream for the one or more media content items to a media playback device.

14. The media deliver system of claim 13, wherein to identify the plurality of playlists further includes filtering out at least some of the playlists based on the playlist descriptions.

15. The media delivery system of claim 13, wherein the instructions further cause the media delivery system to:
for each media content item ID in the plurality of playlists, weight the media content items associated with the tokenized terms, wherein identifying the one or more media content items is based on the tokenized terms and the weighting of the tokenized terms.

16. The media delivery system of claim 15, wherein the instructions further cause the media delivery system to:
after weighting the media content items associated with the tokenized terms, generate an inverted index that stores associations between the media content items with the tokenized terms.

17. The media delivery system of claim 13, wherein the instructions further cause the media delivery system to:
calculate a first term frequency, the first term frequency associated with a frequency of each of the tokenized terms appearing in each of the media content items;
calculate a second term frequency, the second term frequency associated with a frequency of each of the tokenized terms appearing in all of the media content items; and
calculate a relevance score based on the first term frequency and the second term frequency, the relevance score representative of relevancy of each of the tokenized terms to each of the media content items.

18. The media delivery system of claim 17, wherein the one or more media content items are identified from the plurality of playlists based at least in part on the relevance score.

19. The media delivery system of claim 13, wherein the instructions further cause the media delivery system to:
weight the media content items associated with the tokenized terms using term frequency and inverse document frequency (TFIDF).

20. One or more non-transitory computer-readable media comprising computer-executable instructions which, when executed by a media delivery system having one or more servers, cause the media delivery system to:
access a playlist database hosted on at least one of the one or more servers, the playlist database storing playlists, each playlists having a playlist description and a list of media content item IDs, the media content item IDs being associated with media content items;
identify a plurality of playlists from the playlist database;
for each of the plurality of playlists:
tokenize the playlist description into one or more tokenized terms; and
associate each of the media content item IDs in the playlist with tokenized terms by assigning the one or more tokenized terms to each of the media content item IDs in a descriptive search database, wherein at least one media content item ID is assigned at least one tokenized term from more than one of the plurality of playlists;
identify one or more media content items based on the tokenized terms assigned to the media content item IDs in the descriptive search database, wherein at least one identified media content item is identified based on the tokenized terms from more than one playlist being assigned to the at least one media content item ID from more than one of the plurality of playlists; and
transmit a media stream for the one or more media content items to a media playback device.

* * * * *